US012714213B2

(12) United States Patent
Tran et al.

(10) Patent No.: US 12,714,213 B2
(45) Date of Patent: Aug. 25, 2026

(54) PERSONAL CARRYING DEVICES

(71) Applicant: CTB HOLDINGS LLC, Menlo Park, CA (US)

(72) Inventors: Thuan Tran, San Jose, CA (US); Charlie Carroll, Portola Valley, CA (US); Binh Tran, San Jose, CA (US)

(73) Assignee: CTB Holdings LLC, Menlo Park, CA (US)

( * ) Notice: Subject to any disclaimer, the term of this patent is extended or adjusted under 35 U.S.C. 154(b) by 46 days.

(21) Appl. No.: 18/365,004

(22) Filed: Aug. 3, 2023

(65) Prior Publication Data

US 2024/0041176 A1 Feb. 8, 2024

Related U.S. Application Data

(60) Provisional application No. 63/395,309, filed on Aug. 4, 2022.

(51) Int. Cl.
*F16B 45/02* (2006.01)
*A45C 1/06* (2006.01)
(Continued)

(52) U.S. Cl.
CPC .............. *A45C 13/023* (2013.01); *A45C 1/06* (2013.01); *A45C 13/185* (2013.01); *A45F 5/021* (2013.01);
(Continued)

(58) Field of Classification Search
CPC ...... F16B 45/02; F16B 45/023; F16B 45/024; F16B 45/026; F16B 45/035; F16B 45/036;
(Continued)

(56) References Cited

U.S. PATENT DOCUMENTS

| | | | | |
|---|---|---|---|---|
| 286,253 A * | 10/1883 | Benson | F16B 45/023 | 59/88 |
| 370,983 A * | 10/1887 | Stahl | F16B 45/024 | 24/600.1 |

(Continued)

FOREIGN PATENT DOCUMENTS

| | | |
|---|---|---|
| CA | 2471793 C | 6/2003 |
| CN | 305992507 | 8/2020 |

(Continued)

OTHER PUBLICATIONS

Dango Products—"Wallet Collections"—Available from Internet <URL: www.dangoproducts.com/collections/wallets>—Available at least as of Oct. 19, 2017—Retrieved from Internet Archive Wayback Machine <URL: https://web.archive.org/web/20171019082039/www.dangoproducts.com/collections/wallets> on Oct. 23, 2020.

(Continued)

*Primary Examiner* — Jason W San
*Assistant Examiner* — Anna S Rashid
(74) *Attorney, Agent, or Firm* — Levine Bagade Han LLP

(57) ABSTRACT

The disclosure includes a carrying device comprising a carabiner including a first clip and a second clip, wherein the first clip is configured to open to access a first chamber, and the second clip is configured to open to access a second chamber located adjacent the first chamber, and a shackle defining a first end and a second end located opposite the first end, wherein the first end is configured to detachably couple to the carabiner, and the second end is configured to receive at least one key.

19 Claims, 23 Drawing Sheets

(51) Int. Cl.
*A45C 13/02* (2006.01)
*A45C 13/18* (2006.01)
*A45F 5/02* (2006.01)
*E05B 67/06* (2006.01)
*A45F 5/00* (2006.01)

(52) U.S. Cl.
CPC ............ *E05B 67/06* (2013.01); *F16B 45/022* (2021.05); *A45C 2001/065* (2013.01); *A45F 2005/002* (2013.01); *A45F 2005/006* (2013.01); *A45F 5/1558* (2025.01)

(58) Field of Classification Search
CPC ............... F16B 45/022; Y10T 24/3411; Y10T 24/3415; Y10T 24/3443; Y10T 24/3445; Y10T 24/3447; Y10T 24/3451; Y10T 24/3465; A45C 13/023; A45C 1/06; A45C 13/185; A45C 2001/065; A45F 5/021; A45F 5/1558; A45F 2005/002; A45F 2005/006; E05B 67/06
See application file for complete search history.

(56) References Cited

U.S. PATENT DOCUMENTS 499,304 A * 6/1893 Minshall ............... F16B 45/024 24/599.6
516,897 A * 3/1894 McMillan ............ F16B 45/024 24/599.6
565,520 A * 8/1896 Stilson ................. F16B 45/023 24/599.4
620,396 A * 2/1899 Wilson .................. F16B 45/023 24/599.8
688,006 A * 12/1901 Rickman ............... F16B 45/026 24/599.7
768,817 A * 8/1904 Nearing ................ F16B 45/024 24/599.6
1,262,974 A * 4/1918 Pearen .................. F16B 45/023 24/598.5
1,362,512 A * 12/1920 Schermuly ............ F16B 45/035 24/599.9
1,415,276 A 5/1922 Edward
1,417,949 A * 5/1922 Sleeper ................. F16B 45/023 24/599.7
1,463,619 A 7/1923 Gardner
1,585,051 A 5/1926 Skoglund
1,670,343 A 5/1928 Clemens
1,832,625 A 11/1931 Gardner
1,908,115 A 5/1933 Chadwick
2,288,704 A 7/1942 Herbener
2,511,533 A 6/1950 Sindey
2,608,736 A * 9/1952 Blazewicz ............ F16B 45/026 24/599.7
D187,240 S 2/1960 Harkins
3,159,891 A * 12/1964 Brewer ................. F16B 45/023 24/601.7
3,328,858 A * 7/1967 Connolly .............. F16B 45/024 24/599.4
3,461,469 A 8/1969 Morrision
D256,852 S 9/1980 Mcgahee
4,305,497 A 12/1981 Pacilio
D266,479 S 10/1982 Hayakawa
4,691,456 A 9/1987 Ackeret
4,705,086 A 11/1987 O'Neill
4,763,821 A 8/1988 Powell
4,774,779 A 10/1988 Ackeret
4,932,520 A 6/1990 Ciarcia
D314,865 S 2/1991 Tuisku
5,038,926 A 8/1991 Van Der Toorn
D322,039 S 12/1991 Chien
5,077,869 A 1/1992 Haase
D337,656 S 7/1993 Hostert
5,234,351 A 8/1993 Dixon
5,279,019 A 1/1994 Knickle
5,328,026 A 7/1994 Newman
D360,815 S 8/1995 Padden
D366,146 S 1/1996 Bertrand
D374,388 S 10/1996 Padden
5,573,164 A 11/1996 Law
5,592,767 A 1/1997 Treske
D384,499 S 10/1997 Gaestel
5,740,624 A 4/1998 Baseley
D398,446 S 9/1998 Hosea
D404,567 S 1/1999 Akutsu
5,901,764 A 5/1999 Ritter
D411,766 S 7/1999 Elkington
5,929,427 A 7/1999 Harada
5,940,943 A * 8/1999 Kloster .................. F16B 45/02 24/DIG. 37
5,944,080 A 8/1999 Podwika
D416,581 S 11/1999 Cheng
6,009,584 A 1/2000 Padden
6,044,967 A 4/2000 Painsith
6,076,665 A 6/2000 Chuang
6,089,289 A 7/2000 Florjancic
D431,105 S 9/2000 Ling
D431,719 S 10/2000 Mucarquer
6,145,994 A 11/2000 Ng
D434,624 S 12/2000 Padden
D444,060 S 6/2001 Elsener
D444,685 S * 7/2001 Shenkel .......................... D8/18
6,276,414 B1 8/2001 Bibb
D447,438 S 9/2001 DiLibero
6,347,875 B1 2/2002 Painsith
D462,000 S 8/2002 Hightower
6,427,837 B1 8/2002 Shields
6,460,698 B1 10/2002 Wang
6,823,910 B1 11/2004 Elnekaveh
6,851,147 B2 2/2005 Abrahall
D517,390 S 3/2006 Cheng
D525,162 S 7/2006 Suman
7,093,330 B2 * 8/2006 Ferguson ............. F16B 45/026 24/599.6
7,334,616 B2 2/2008 Kaminski
D575,506 S 8/2008 Huang
7,546,860 B1 6/2009 Mehdizadeh
7,556,073 B2 7/2009 Lyons
7,568,250 B2 8/2009 Menard-Flanagan
7,604,028 B2 10/2009 Bridgefarmer
7,617,928 B1 11/2009 Murphy
D608,184 S * 1/2010 Kelleghan ...................... D8/356
D632,695 S 2/2011 Berntsen
7,918,335 B1 4/2011 Kitchen
7,921,890 B2 4/2011 Ho
7,928,335 B2 4/2011 Kitchen
D637,648 S 5/2011 Ringl
7,971,324 B2 7/2011 Preston-Hall
8,047,363 B2 11/2011 Sheba
8,251,210 B2 8/2012 Schmidt
8,434,429 B2 * 5/2013 Moeller ............... A01K 27/005 119/779
D685,990 S 7/2013 Zhang
D690,931 S 10/2013 Minn
8,567,459 B2 10/2013 Kitchen
8,567,460 B1 10/2013 Lentsch
D695,013 S 12/2013 Minn
D701,043 S 3/2014 Minn
8,726,952 B2 5/2014 Jambunathan
D706,271 S 6/2014 Gelsomini
D707,091 S 6/2014 Barr
8,763,795 B1 7/2014 Oten
8,776,846 B1 7/2014 Thompson
D716,043 S 10/2014 Wilk
8,863,793 B2 10/2014 Black
D718,525 S 12/2014 Kim
D719,350 S 12/2014 Daoura
8,899,411 B2 12/2014 Van Geer
9,125,464 B2 9/2015 Minn
9,125,465 B2 9/2015 Beckley
D743,760 S 11/2015 Barr
D745,274 S 12/2015 Minn
9,255,602 B2 * 2/2016 Liang .................... F16B 45/036

(56) References Cited

U.S. PATENT DOCUMENTS

D750,888 S 3/2016 Johnson
D751,877 S 3/2016 Shlaferman
D755,764 S 5/2016 Dong
9,339,094 B2 5/2016 Tucker-Skow
D765,487 S 9/2016 Barr
D768,382 S 10/2016 Wu
D768,383 S 10/2016 Wu
D770,775 S 11/2016 Robertson
D772,029 S * 11/2016 Spater .............................. D8/18
D772,678 S 11/2016 Haarburger
D775,824 S 1/2017 King
D780,449 S 3/2017 King
9,615,641 B2 4/2017 Yeung
D785,317 S * 5/2017 Grossman ...................... D8/356
9,648,931 B2 5/2017 Sha
9,661,908 B2 5/2017 Mayer
D792,749 S 7/2017 Faro
D798,591 S 10/2017 King
D799,301 S 10/2017 Cetera
9,775,328 B1 10/2017 Fidrych
9,815,212 B2 11/2017 Barr
D805,770 S 12/2017 Justiss
D805,873 S 12/2017 Cetera
D806,386 S 1/2018 King
D808,158 S 1/2018 King
D808,765 S 1/2018 Kisling
D809,792 S 2/2018 Moon
9,907,375 B1 3/2018 Kitchen
D814,182 S 4/2018 Haarburger
D814,183 S 4/2018 Haarburger
D815,932 S 4/2018 Lee
D815,935 S 4/2018 Barak
D817,196 S 5/2018 Haarburger
D817,316 S 5/2018 Srour
D818,708 S 5/2018 An
D821,090 S * 6/2018 Case .............................. D8/356
D827,408 S 9/2018 Stefanczyk-Lacor
D828,023 S 9/2018 Serman
D828,024 S 9/2018 Serman
D828,025 S 9/2018 Serman
10,080,409 B2 9/2018 King
D831,349 S 10/2018 Deng
10,123,596 B2 11/2018 King
D835,408 S 12/2018 Justiss
D835,409 S 12/2018 Justiss
D835,410 S 12/2018 Chan
D836,335 S 12/2018 Serman
D836,336 S 12/2018 Serman
D836,914 S 1/2019 Reinhart
10,201,216 B2 2/2019 Van Geer
10,206,473 B2 * 2/2019 Haarburger .............. A45C 1/06
D842,070 S 3/2019 Kisling
D845,623 S 4/2019 Sullivan
D854,916 S * 7/2019 Derr .............................. D8/356
D856,956 S 8/2019 Liu
10,368,618 B2 8/2019 Richards
D858,984 S 9/2019 Zucco
D860,645 S 9/2019 Wu
D861,327 S * 10/2019 Osmanski ...................... D3/207
D861,339 S 10/2019 Moon
D866,177 S 11/2019 Leh
D866,178 S 11/2019 Jin
D866,276 S 11/2019 Shlaferman
D866,964 S 11/2019 Tran
D868,463 S 12/2019 Tran
D869,843 S 12/2019 Zhou
10,512,316 B2 12/2019 Haarburger
D875,490 S 2/2020 Barr
D877,513 S 3/2020 Duncan
D877,594 S 3/2020 Liang
D878,891 S 3/2020 Polczynski
D878,893 S 3/2020 Kao
D879,580 S 3/2020 Spater
10,584,736 B2 * 3/2020 Ormsbee ............... F16B 45/036
10,595,611 B2 3/2020 Berkley
D881,671 S 4/2020 Kao
D884,338 S 5/2020 Liu
D884,339 S 5/2020 Li
D884,792 S 5/2020 Swallow
D887,708 S 6/2020 Tran
D887,709 S 6/2020 Fenton
D890,525 S 7/2020 Leh
D891,089 S * 7/2020 He ................................ D3/207
D891,101 S 7/2020 Lv
D891,767 S 8/2020 Lamb
D893,975 S 8/2020 Tran
D895,276 S 9/2020 Leh
D895,961 S 9/2020 Swan
D895,963 S 9/2020 Anderson
D896,506 S 9/2020 Anderson
10,781,848 B2 * 9/2020 Cowell .................. A63B 29/02
10,791,808 B2 10/2020 Kane
D904,016 S 12/2020 Jacobsen
D904,143 S 12/2020 Hollinger
10,858,222 B1 * 12/2020 Laarman ................... B66C 1/36
D908,351 S 1/2021 Hoffman
D908,352 S 1/2021 Pirker
D909,059 S 2/2021 Leh
D915,066 S 4/2021 Blackrock
D915,765 S 4/2021 Quittner
D917,879 S 5/2021 Chui
D918,002 S 5/2021 Borenstein
11,051,492 B2 * 7/2021 Zhang ................... F16B 45/026
D930,634 S 9/2021 Azodi
D930,981 S 9/2021 Ghazzaoui
D932,182 S 10/2021 Foy
D933,355 S * 10/2021 Grossman ...................... D3/207
D933,360 S 10/2021 Qing
D934,560 S 11/2021 Tran
11,178,947 B2 11/2021 Tran
11,235,202 B2 * 2/2022 Connell ................ F16B 45/021
11,284,689 B1 3/2022 Duncan
11,311,087 B2 4/2022 Del Moral
D950,240 S 5/2022 Tran
D950,241 S 5/2022 Tran
D951,632 S 5/2022 Tran
11,337,498 B2 5/2022 Tran
11,425,976 B1 8/2022 Tran
D964,735 S 9/2022 Zeng
11,439,214 B2 9/2022 Tran
D967,626 S 10/2022 Tran
11,457,704 B2 10/2022 Hoffman
D972,841 S 12/2022 Tran
11,629,749 B2 * 4/2023 Adelman .............. F16B 45/023
24/376
11,653,729 B2 5/2023 Tran
11,761,473 B1 * 9/2023 Adelman .............. F16B 45/037
24/376
11,795,992 B1 * 10/2023 Feng ..................... F16B 45/023
11,805,874 B1 * 11/2023 Feng .................... A45C 11/182
D1,015,124 S * 2/2024 Adelman ....................... D8/356
D1,069,557 S * 4/2025 Noble ............................ D8/356
12,320,407 B2 * 6/2025 Ma ........................ F16B 45/023
2002/0179463 A1 12/2002 Newman
2004/0148837 A1 8/2004 Lewis
2004/0208692 A1 * 10/2004 Anthony ............... F16B 45/026
403/327
2005/0035006 A1 2/2005 Dohner
2007/0062013 A1 * 3/2007 Mueller ................ F16B 45/023
24/599.1
2007/0109130 A1 5/2007 Edenfield
2007/0193005 A1 * 8/2007 Chalk .................. A01K 27/003
24/265 H
2008/0314483 A1 12/2008 Armstrong
2009/0000086 A1 * 1/2009 Bing ....................... F16B 45/06
24/592.11
2009/0199940 A1 8/2009 Toner
2010/0147913 A1 * 6/2010 Corets ..................... B60R 7/043
224/269
2011/0308972 A1 12/2011 Streem
2012/0012478 A1 * 1/2012 Berman ............... A45C 13/008
206/223

(56) References Cited

U.S. PATENT DOCUMENTS

| | | | | |
|---|---|---|---|---|
| 2012/0201599 | A1* | 8/2012 | Reppen | F16G 15/06 403/348 |
| 2012/0210542 | A1* | 8/2012 | Yang | F16B 45/023 24/369 |
| 2012/0228168 | A1 | 9/2012 | Kitchen | |
| 2013/0056119 | A1 | 3/2013 | Henriette | |
| 2013/0135103 | A1 | 5/2013 | Holloway | |
| 2013/0247339 | A1* | 9/2013 | Wurzer | F16B 45/06 24/600.1 |
| 2013/0276943 | A1 | 10/2013 | Minn et al. | |
| 2014/0115840 | A1* | 5/2014 | Liang | F16B 45/06 24/600.2 |
| 2014/0143958 | A1 | 5/2014 | Barr | |
| 2015/0059937 | A1 | 3/2015 | Singer | |
| 2015/0083289 | A1 | 3/2015 | Johnson | |
| 2015/0240524 | A1 | 8/2015 | Olroyd | |
| 2015/0257499 | A1 | 9/2015 | Muir | |
| 2015/0282579 | A1 | 10/2015 | Piro | |
| 2016/0022000 | A1 | 1/2016 | Tucker-Skow | |
| 2016/0153487 | A1* | 6/2016 | Hollinger | F16B 45/036 24/492 |
| 2016/0206065 | A1 | 7/2016 | Ehrlich | |
| 2016/0255918 | A1* | 9/2016 | Grossman | F16B 45/036 |
| 2016/0324283 | A1 | 11/2016 | Kane | |
| 2016/0374443 | A1 | 12/2016 | Kim | |
| 2017/0035169 | A1 | 2/2017 | Haarburger | |
| 2017/0055654 | A1 | 3/2017 | King | |
| 2017/0119115 | A1 | 5/2017 | King | |
| 2017/0120087 | A1* | 5/2017 | Cowell | A62B 35/0006 |
| 2017/0135452 | A1 | 5/2017 | Kane | |
| 2017/0224077 | A1 | 8/2017 | Mayer | |
| 2017/0265600 | A1* | 9/2017 | Winsen | A44B 15/007 |
| 2017/0265610 | A1 | 9/2017 | Smith | |
| 2018/0027935 | A1 | 2/2018 | Laatz | |
| 2018/0064223 | A1 | 3/2018 | Singer | |
| 2018/0100649 | A1* | 4/2018 | Mojica | F16B 45/036 |
| 2018/0142725 | A1* | 5/2018 | Cowell | F16B 45/023 |
| 2018/0311804 | A1 | 11/2018 | Weinberger | |
| 2018/0325228 | A1 | 11/2018 | Leimer | |
| 2018/0332936 | A1 | 11/2018 | Serman | |
| 2018/0368547 | A1 | 12/2018 | Grannan | |
| 2019/0008253 | A1 | 1/2019 | Deng | |
| 2019/0017535 | A1* | 1/2019 | Ormsbee | F16B 1/00 |
| 2019/0024698 | A1* | 1/2019 | Berndorfer | F16B 45/023 |
| 2019/0318667 | A1 | 10/2019 | Freeman | |
| 2019/0365066 | A1 | 12/2019 | Hill | |
| 2020/0077758 | A1 | 3/2020 | Hoffman | |
| 2020/0206549 | A1* | 7/2020 | Shaver | A62B 35/0037 |
| 2020/0229557 | A1 | 7/2020 | Tran | |
| 2020/0261772 | A1* | 8/2020 | Connell | F16B 45/024 |
| 2020/0305564 | A1 | 10/2020 | Myers | |
| 2020/0362908 | A1* | 11/2020 | Rhett, Jr. | F16B 45/00 |
| 2020/0379509 | A1 | 12/2020 | Coward | |
| 2021/0112935 | A1 | 4/2021 | Tran | |
| 2021/0131481 | A1* | 5/2021 | Walker | F16B 45/023 |
| 2021/0196018 | A1* | 7/2021 | Mihirogi | A45F 5/1516 |
| 2021/0330045 | A1 | 10/2021 | Tran | |
| 2021/0337945 | A1 | 11/2021 | Popoff | |
| 2021/0393998 | A1* | 12/2021 | Cowell | A62B 35/0037 |
| 2022/0018384 | A1* | 1/2022 | Adelman | A44B 15/00 |
| 2022/0087386 | A1* | 3/2022 | Wright | A45C 1/06 |
| 2022/0225742 | A1 | 7/2022 | Tran | |
| 2022/0355135 | A1* | 11/2022 | Winters | A62B 35/0081 |
| 2023/0235776 | A1* | 7/2023 | Grossman | F16B 45/02 24/599.5 |
| 2023/0243384 | A1* | 8/2023 | Adelman | F16B 45/02 24/376 |
| 2023/0248127 | A1 | 8/2023 | Tran | |
| 2023/0300231 | A1* | 9/2023 | Gause | B25F 1/00 455/575.8 |
| 2024/0239572 | A1* | 7/2024 | Enghard | B65D 51/242 |
| 2024/0359071 | A1* | 10/2024 | Wu | F16B 45/024 |
| 2025/0001798 | A1* | 1/2025 | Lemay | B43M 11/04 |

FOREIGN PATENT DOCUMENTS

| | | | |
|---|---|---|---|
| CN | 306924723 | | 11/2021 |
| KR | 101356236 | B1 | 1/2014 |
| KR | 20140003803 | U | 6/2014 |
| WO | 2006021042 | A1 | 3/2006 |

OTHER PUBLICATIONS

Onward Innovation—"RFID Carbon Fiber Cash Strap Wallet"—Downloaded Jun. 11, 2022—Available from Internet <URL: https://onwardinnovation.com/products/rfid-carbon-fiber-cash-strap-wallet>.

Ridge—"Aluminum—Black"—Downloaded Apr. 9, 2021—Available from Internet <URL: https://ridge.com/products/aluminum-black?>.

Titan X—"Titan X | Pro Edition"—Downloaded Jun. 11, 2022—Available from Internet <URL: https://titanxwallet.com/products/edition>.

Alpine Swiss—"Alpine Swiss Genuine Leather Super Thing Slim Cash Strap Front Pocket Wallet"—Downloaded Apr. 9, 2021—Available from Internet <URL: https://www.alpineswiss.com/alpine-swiss-genuine-leather-super-thin-slim-cash-strap-front-pocket-wallet/>.

Simple Zone—"Carbon Fiber Wallet for Men, Simple Zone RFID Blocking Slim Minimalist Card Holder Wallet with Money Clip and Cash Strap"—First available Jun. 18, 2020—Downloaded Apr. 9, 2021—Available from Internet <URL: https://www.amazon.com/Carbon-Simple-Zone-Blocking-Minimalist/dp/B08BG4G8GJ>.

Dango Products—"T01 Tactical Bifold Wallet—Spec-Ops—Blueline"—Downloaded Apr. 9, 2021—Available from Internet <URL: https://www.dangoproducts.com/products/t01-tactical-bifold-wallet-blueline-spec-ops?variant=21433891881044>.

Dango Products—"Dango M1 Maverick Wallet—CNC- Machined Aluminum, RFID Blocking, Made in USA"—First available Jan. 12, 2019—Downloaded Jun. 11, 2022—Available from Internet <URL: https://www.amazon.com/dp/B07MMDRGCV>.

Dango Products—"Dango Products—M1 Maverick Bifold Wallet"—Video by user Dango Products—First available Nov. 29, 2018—Downloaded May 24, 2021—Available from Internet <URL: https://www.youtube.com/watch?v=kqF_xCWWLOU>.

Muradin—"Muradin Dapper Leather Bifold Wallet—Genuine Tactical Wallet—Card Wallet for Men—RFID-Blocking Aluminum Metal Wallet"—First available Nov. 22, 2020—Downloaded May 24, 2021—Available from Internet <URL: https://www.amazon.com/MURADIN-Dapper-Leather-Bifold-Wallet/dp/B07ZPXH81N?th=1>.

Dango Products—"A10 Adapt Wallet"—Downloaded May 25, 2021—Available from Internet <URL: https://www.dangoproducts.com/collections/a-series-wallets/products/a10-adapt-wallet>.

Hanker—"Carbon Fiber Aluminum Metal Minimalist Wallet RFID Blocking Credit Card Holder Money Clip"—First available Feb. 7, 2019—Downloaded May 25, 20219—Available from Internet <URL: https://www.amazon.com/Carbon-Aluminum-Minimalist-Wallet-Blocking/dp/B07NHK6P55>.

EELV—"ELV Badge Holder Wallet, Aluminium ID Badge Card Holder Heavy Duty with Quick Release Button, Metal Clip for Offices ID, School ID, Driver Licence, Wallet, Holds 1-4 Cards"—First available Jan. 21, 2019—Downloaded Jun. 11, 2022—Available from Internet <URL: https://www.amazon.com/ELV-Aluminum-Release-Offices-License/dp/B07MZJYVBX/>.

Elephant Wallet—"N Wallet Carbon Fiber—Fabric Rubber"—Downloaded Mar. 17, 2021—Available from Internet <URL: https://elephantwallet.com/products/n-wallet-carbon-fiber>.

Elephant Wallet—"How Does It Work (X Wallet)"—Downloaded Mar. 17, 2021—Available from Internet <URL: https://elephantwallet.com/pages/how-does-it-work>.

Wallet Gear—"Bifold Leather Wallet with Elastic Band"—Downloaded Mar. 17, 2021—Available from Internet <URL: https://www.walletgear.com/bifold-leather-wallet-with-elastic-band.html>.

(56) References Cited

OTHER PUBLICATIONS

Curated Basics—“Elastic Band Minimalist Wallet”—Downloaded Mar. 17, 2021—Available from Internet <URL: https://www.curatedbasics.com/products/elastic-band>.

Dango Products—“Dango D03 Dapper Bifold EDC Wallet—Made in USA—Genuine Leather, Slim, Minimalist, Metal, RFID Blocking”—Downloaded Jun. 11, 2022—Available at least as of Apr. 22, 2021 (first review)—Available from Internet <URL: https://www.amazon.com/Dango-D03-Dapper-Bifold-Wallet/dp/B0925CV8CK?ref_=ast_sto_dp&th=1>.

Dango Products—“D03 Dapper Bifold Wallet”—Downloaded Jun. 11, 2022—Available from Internet <URL: https://www.dangoproducts.com/products/d03-dapper-wallet>.

Dango Products—“Dango Products: D03 Dapper Bifold Wallet”—Video by user Dango Products—First available Apr. 20, 2021—Downloaded Nov. 24, 2021—Available from Internet <URL: https://www.youtube.com/watch?v=QSLs3ABQcoY>.

Dango Products—“A10 Bifold Pen Adapter”—Video by user Dango Products—First available Jul. 15, 2020—Downloaded Nov. 24, 2021—Available from Internet <URL: https://www.youtube.com/watch?v=7y6fXT8Y0SI>.

Dango Products—“A10 Adapt Bifold Pen Wallet”—Downloaded Jun. 11, 2022—Available from Internet <URL: https://www.dangoproducts.com/products/a10-adapt-bifold-pen-wallet>.

Dango Products—“Dango M1 Maverick Rail EDC Wallet—Made in USA—All-Metal, Minimalist, Slim, RFID Blocking”—First Available Oct. 9, 2019—Downloaded Nov. 24, 2021—Available from Internet <URL: https://www.amazon.com/Dango-M1-Maverick-Rail-Wallet/dp/B07YWJWK9Z>.

Dango Products—“Dango M1 Maverick Rail Wallet”—First Available Oct. 7, 2019—Downloaded Nov. 24, 2021—Available from Internet <URL: https://www.youtube.com/watch?v=5xTPdgAZkL8>.

Dango Products—“M1 Maverick Rail Wallet”—Downloaded Nov. 24, 2021—Available from Internet <URL: https://www.dangoproducts.com/products/m1-maverick-rail-wallet.

Anvi Original—“MiniCap 1.0/2.0 Mens RFID Blocking Front Pocket Minimalist Slim Wallet With Pull Tab Money Clip”—First available Sep. 14, 2018—Downloaded Nov. 11, 2021—Available from Internet <URL: https://www.amazon.com/Minicap1-0-Blocking-Pocket-Minimalist-Wallet/dp/B07HCD1BRR>.

Leatheram—“Handmade pull up card holder, leather credit card case with pull tab, minimalist wallet, thin minimal wallet”—Available at least as of Dec. 14, 2019—Downloaded Jun. 11, 2022—Available from Internet <URL: https://www.etsy.com/listing/235786494/>.

Enigma—“Muradin Chocolate Front Pocket Wallet for Men Travel Tactical bifold RFID Blocking Aluminum Metal Leather Money Cards Holder Ideal Men’s Gift”—Available at least as of Jul. 6, 2021—Downloaded Jun. 11, 2022—Available from Internet <URL: https://www.amazon.com/MURADIN-Chocolate-Tactical-Blocking-Aluminum/dp/B097SKPGJP>.

Nite Ize—“Nite Ize Financial Tool, Multi Tool Money Clip, Minimalist Wallet, Money Clip, Multi Tool, and Credit Card Holder Combo, Stainless Steel”—First available Mar. 1, 2018—Downloaded Jun. 11, 2022—Available from Internet <URL: https://www.amazon.com/gp/product/B078KZSGKR>.

Safe Price—“Stainless Steel Men Money Clip Elastic Band Slim Credit Card Holder Wallet Purse (Silver)”—First available Sep. 20, 2017—Downloaded Jul. 29, 2021—Available from Internet <URL: https://www.amazon.com/Stainless-Elastic-Credit-Holder-Wallet/dp/B075S95PQ7?th=1>.

Micrometalinc—“Titanium Money Clip | Bottle Opener | CNC: 65MC43753F2 | 1x Money Clip”—Available at least as of May 13, 2020—Downloaded Jun. 11, 2022—Available from Internet < URL: https://www.etsy.com/listing/974788562>.

TI-EDC—“TI-EDC Titanium Slim Cash Money Clip Wallet Credit Card Holder and Bottle Opener”—First Available Dec. 10, 2013—Downloaded Jun. 11, 2022—Available from Internet <URL: https://www.amazon.com/TI-EDC-Titanium-Wallet-Credit-Holder/dp/B00H7UHZZY>.

Cheers All—“Beer Opener Money Clip”—Downloaded Jun. 11, 2022—Available from Internet <URL: https://cheersall.com/products/beer-opener-money-clip>.

Nomatic—Wallet—Downloaded Jun. 11, 2022—Available from Internet <URL: https://www.nomatic.com/products/wallet>.

Distil—Wally Bifold Classic—Downloaded Jun. 11, 2022—Available from Internet <URL: https://distilunion.com/products/wally-bifold>.

Enigma—Enigma Dapper PU Leather Bifold Front Pocket Slim Wallet for Men, Aluminum Metal Travel Tactical RFID Blocking Card Holder Money Clip, Ideal Men’s Gift—Available at least as of Jul. 13, 2021—Downloaded Jun. 11, 2022—Available from Internet <https://www.amazon.com/ENIGMA-Leather-Aluminum-Tactical-Blocking/dp/B097RCJJVJ>.

Dango Products—“Dango Products—M1 Maverick Bifold Wallet Spec-Ops Edition”—First Available Nov. 29, 2018—Downloaded Nov. 23, 2021—Available from Internet <URL: https://www.youtube.com/watch?v=KSFzWMDOTAc>.

Dango Products—“Dango Products—MT01 Clasp Multi-Tool”—First Available Mar. 19, 2019—Downloaded Nov. 23, 2021—Available from Internet <URL: https://www.youtube.com/watch?v=7SVGTLoDUsE>.

Dango Products—“A10 Adapt Wallet”—Downloaded Jun. 11, 2022—Available from internet <URL: https://www.dangoproducts.com/collections/a-series-wallets/products/a10-adapt-wallet>.

Dango Products—“Dango Products—A10 Adapt Wallet”—First available: Jul. 15, 2020—Downloaded Jun. 11, 2022—Available from internet <URL: https://www.youtube.com/watch?v=EheKLMq84-8>.

Dango Products—“M1 Maverick Wallet”—Downloaded Sep. 8, 2022—Available from Internet <URL: https://www.dangoproducts.com/collections/m1-maverick-wallets/products/m1-maverick-tactical-bifold-wallet-raw>.

Dango Products—“D01 Dapper Wallet”—Downloaded Sep. 8, 2022—Available from Internet <URL: https://www.dangoproducts.com/products/d01-dapper-wallet>.

Dango Products—“Dango Products—A10 Pull Pocket Adapter”—Video by user Dango Products—First available Feb. 17, 2021—Downloaded Sep. 30, 2022—Available from Internet <URL: https://www.youtube.com/watch?v=DTIdZDIBk2I>.

Dango Products—“Dango Products—T01 Tactical and D01 Dapper Wallet | Overview and Instructions” Video by user Dango Products—Available from Internet: <URL: https://www.youtube.com/watch?v=Sj60qwXjZAA> (Year: 2016).

Dango Products—“Dango Products | Redefining the Wallet”—Kickstarter © campaign—Available from Internet: <URL: https://www.kickstarter.com/projects/1592811030/dango-products-redefining-the-wallet/description> (Year: 2016).

Semorid—“Semorid Leather Skin Rfid Credit Card Holder Metal Men Wallets 2021 Badge Cardholder Aviator Minimalist Wallet for Card”—Downloaded Jan. 10, 2023—Available from Internet: <URL:https://www.aliexpress.us/item/3256801654742032.html.

Fashion Wallet—“2022 Genuine Leather Metal Rfid Credit Card Holders Anti-Thieft Bifold Money Bag Business Badge Minimalist Men Wallet”—Downloaded Jan. 10, 2023—Available from Internet: <URL: https://www.aliexpress.us/item/3256804138918235.html>.

* cited by examiner

PERSONAL CARRYING DEVICES

CROSS-REFERENCE TO RELATED APPLICATIONS

The present application claims priority to U.S. Provisional Patent Application No. 63/395,309 filed on Aug. 3, 2022, entitled "PERSONAL CARRYING DEVICES" the entire disclosure of which is incorporated by reference herein.

BACKGROUND OF THE INVENTION

The purpose of a carabiner is to quickly and securely connect different objects or components together. Carabiners often consist of a metal loop with a spring-loaded gate that can be opened and closed. The gate allows for easy attachment and detachment of objects. They can be used for outdoor activities, such as rock climbing, and also for securing keys, water bottles, tools, and various accessories to backpacks, belts, or gear loops. Carabiners provide a convenient and reliable way to keep items easily accessible while on the move; however, the traditional carabiner design has some drawbacks that the present disclosure seeks to remedy.

SUMMARY OF THE INVENTION

The disclosure includes a wallet comprising a first personal card receiving area defining a first side wall, a second side wall located a first distance from the first side wall, and a first bottom side wall extending between the first side wall and the second side wall, and a second personal card receiving area defining a third side wall, a fourth side wall located a second distance from the third side wall, and a second bottom side wall extending between the third side wall and the fourth side wall. In some embodiments, the first personal card receiving area is located opposite the second personal card receiving area, the first side wall is located opposite the fourth side wall, the second side wall is located opposite the third side wall, and the first bottom side wall is located opposite the second bottom side wall.

The first personal card receiving area may be configured to receive and retain at least one personal card with respect to the first side wall, the second side wall, and the first bottom side wall, and the second personal card receiving area may be configured to receive and retain at least one personal card with respect to the third side wall, the fourth side wall, and the second bottom side wall. In some embodiments, the first distance defines a length of the first bottom side wall, and wherein the second distance defines a length of the second bottom side wall.

The wallet may include a first protruding portion coupled to the first side wall and configured to move away from the second side wall to thereby receive the at least one personal card. In some embodiments, the first side wall defines a first top portion and a first bottom portion located adjacent the first bottom side wall, wherein the first protruding portion is located adjacent the first top portion. The wallet may also include a second protruding portion coupled to the second side wall and configured to move away from the first side wall to thereby receive the at least one personal card. In some embodiments, the second side wall defines a second top portion and a second bottom portion located adjacent the first bottom side wall, wherein the second protruding portion is located adjacent the second top portion.

The first protruding portion and the second protruding portion may be configured to move between a locked position and a receiving position. In some embodiments, when the first protruding portion and the second protruding portion are in the locked position, the first protruding portion and the second protruding portion are located a first distance from each other. When the first protruding portion and second protruding portion are in the receiving position, the first protruding portion and the second protruding portion may be located a second distance from each other. The first distance may be less than the second distance.

In some embodiments, the wallet further comprises a third protruding portion coupled to the third side wall and configured to move away from the fourth side wall to thereby receive the at least one personal card. The third side wall may define a third top portion and a third bottom portion located adjacent the second bottom side wall, and the third protruding portion may be located adjacent the third top portion. In some embodiments, the wallet includes a fourth protruding portion coupled to the fourth side wall and configured to move away from the third side wall to thereby receive the at least one personal card. The fourth side wall may define a fourth top portion and a fourth bottom portion located adjacent the second bottom side wall, and the fourth protruding portion may be located adjacent the fourth top portion.

The third protruding portion and the fourth protruding portion may be configured to move between a locked position and a receiving position. In some embodiments, when the third protruding portion and the fourth protruding portion are in the locked position, the third protruding portion and the fourth protruding portion are located a first distance from each other. When the third protruding portion and the fourth protruding portion are in the receiving position, the third protruding portion and the fourth protruding portion may be located a second distance from each other. In some embodiments, the first distance is less than the second distance.

The wallet may also include at least one aperture located along a perimeter of the wallet, wherein the at least one aperture may be configured to receive at least one attaching mechanism. In some embodiments, the at least one attaching mechanism comprises at least one of a keyring, a clip, and a tether.

The wallet may further comprise a stretchable band configured to surround at least a portion of the first personal card receiving area and the second personal card receiving area. In some embodiments, the first side wall, the second side wall, the third side wall, and the fourth side wall are elongate along a first direction, and the first bottom side wall and the second bottom side wall are elongate along a second direction perpendicular to the first direction. The stretchable band may be configured to wrap around at least the portion of the first personal card receiving area and the second personal card receiving area along the second direction. In some embodiments, the stretchable band is configured to couple at least one of at least one personal card and at least one paper bill between the stretchable band and at least one of the first personal card receiving area and the second personal card receiving area.

The disclosure includes a carrying device comprising a carabiner including a first clip and a second clip, wherein the first clip is configured to open to access a first chamber and the second clip is configured to open to access a second chamber located adjacent the first chamber, and a shackle defining a first end and a second end located opposite the first end, wherein the first end is configured to detachably couple to the carabiner, and the second end is configured to receive at least one key. In some embodiments, the carabiner comprises a first end including a first aperture and a second end including a second aperture, wherein the first aperture is configured to couple to an attaching mechanism and the second aperture is configured to couple to the first end of the shackle via a first screw.

The first end of the shackle may define a front side, a back side located opposite the front side, and a channel extending between the front side and the back side. In some embodiments, the channel is configured to receive the second aperture of the carabiner. When the channel receives the second aperture, the first screw may be configured to extend through the front side of the shackle, the second aperture of the carabiner, and the back side of the shackle. In some embodiments, the second aperture and the shackle each extend along a first direction. The first screw may be configured to extend through the shackle and the second aperture along a second direction perpendicular to the first direction.

In some embodiments, the carrying device further comprises a second screw configured to couple to the second end of the shackle, wherein the second end of the shackle defines a first arm comprising a first hole and a second arm comprising a second hole. The second screw may be configured to extend through the first hole, through at least one key, and through the second hole, thereby coupling the at least one key to the second end of the shackle. In some embodiments, the second aperture extends along a first direction and the first screw extends along a second direction perpendicular to the first direction. The first arm and the second arm may each extend along a third direction perpendicular to the first direction and the second direction, and the second screw may extend through the first arm and the second arm along the first direction.

In some embodiments, the first screw comprises a first thumb screw and the second screw comprises a second thumb screw. In some embodiments, the carabiner further comprises a third aperture located adjacent the first aperture and a fourth aperture located adjacent the second aperture, wherein the third aperture and the fourth aperture are each configured to receive at least one attaching mechanism.

The first chamber may be located adjacent the first end of the carabiner, and the second chamber may be located adjacent the second end of the carabiner. In some embodiments, each of the first chamber and the second chamber is configured to receive at least one attaching mechanism. The at least one attaching mechanism may comprise at least one of a keyring, a lanyard, a belt loop, a tether, a chain, and a strap.

In some embodiments, the first clip is configured to separate the first chamber from an outside environment and the second clip is configured to separate the first chamber from the second chamber. The first chamber may be larger than the second chamber. In some embodiments, the carrying device further comprises a plurality of ridges extending along an edge of the carabiner adjacent the first chamber and the second chamber.

The carabiner may define a first side wall and a second side wall located opposite the first side wall. In some embodiments, the first clip is located along the first side wall and the second clip is located along the second side wall. The carrying device may further comprise a divider fixedly coupled to the first side wall and the second side wall, and the divider may be configured to separate the first chamber from the second chamber. In some embodiments, the shackle is configured to detachably couple to the carabiner at one of a first location located along the first side wall and a second location located along a third side wall extending between the first side wall and the second side wall. The carabiner and shackle may each comprise at least one material selected from the group consisting of aluminum, titanium, stainless steel, and combinations thereof.

The disclosure includes a wallet comprising an open-sided shell having a front side and a back side facing opposite the front side, the open-sided shell further comprising a first side wall, a second side wall located opposite the first side wall, and a bottom side wall extending between the first side wall and the second side wall. The wallet may also include a plate configured to couple to the open-sided shell along the first side wall, the second side wall, and the bottom side wall, wherein when the plate is coupled to the open-sided shell the wallet may comprise a personal card receiving area extending from the front side to an interior surface of the plate. In some embodiments, the personal card receiving area is configured to receive and retain at least one personal card. The wallet may further comprise a holster configured to couple to the plate along an exterior surface located opposite the interior surface, wherein the holster may be offset from the plate such that the wallet defines a multi-tool receiving area located between the exterior surface of the plate and an interior surface of the holster. In some embodiments, the wallet includes a multi-tool configured to couple to the multi-tool receiving area.

The wallet may further comprise a first protruding portion coupled to the first side wall and configured to move away from the second side wall to thereby receive the at least one personal card. In some embodiments, the first side wall defines a first top portion and a first bottom portion located adjacent the bottom side wall, and the first protruding portion is located adjacent the first top portion. The wallet may include a second protruding portion coupled to the second side wall and configured to move away from the first side wall to thereby receive the at least one personal card. In some embodiments, the second side wall defines a second top portion and a second bottom portion located adjacent the bottom side wall, and the second protruding portion is located adjacent the second top portion.

The bottom side wall may comprise a first bottom side wall portion and a second bottom side wall portion. In some embodiments, the wallet further comprises an open clearance area located between the first bottom side wall portion and the second bottom side wall portion, the open clearance area configured to receive a user's finger to thereby push the at least one personal card away from the bottom side wall such that the at least one personal card may be removed from the wallet.

In some embodiments, the multi-tool comprises at least one of a bottle opener, a hammer head, a rope tensioner, a serrated edge, a sharp edge, and at least one hex wrench. The exterior surface of the plate may comprise at least one raised portion and the multi-tool may comprise at least one hole sized and configured to receive the at least one raised portion, thereby coupling the multi-tool against the exterior surface of the plate.

The wallet may include a first aperture located on a central portion of the plate, a second aperture located on a central portion of the multi-tool, and a third aperture located on a central portion of the holster. In some embodiments, the first aperture, the second aperture, and the third aperture are configured to align such that a user is able to at least one of view and contact the at least one personal card located in the personal card receiving area. The wallet may also include at least one aperture located along a perimeter of the open-sided shell, the at least one aperture configured to couple to at least one attaching mechanism. In some embodiments, the at least one attaching mechanism comprises at least one of a keyring, a tether, and a clip.

In some embodiments, the wallet further comprises an exterior pocket configured to detachably couple to the back side of the open-sided shell, wherein the exterior pocket is located opposite the holster, and wherein the exterior pocket is configured to receive and retain the at least one personal card. The wallet may include a pull tab coupled to the exterior pocket and configured to extend from an opening in the exterior pocket, and the pull tab may be configured to facilitate removal of the at least one personal card from the exterior pocket.

In some embodiments, the pull tab defines a first portion and a second portion, and the pull tab is configured to move between a first position and a second position. In the first position, the first portion of the pull tab may be configured to extend from the opening in the exterior pocket and the second portion of the pull tab may be located at least partially within the exterior pocket, and the at least one personal card may be located within the exterior pocket. In some embodiments, in the second position, the first portion of the pull tab and the second portion of the pull tab are configured to extend from the opening in the exterior pocket, and the at least one personal card is configured to at least partially extend from the exterior pocket.

The back side of the open-sided shell may comprise a channel and the exterior pocket may comprise a back plate configured to slideably couple to the channel, thereby coupling the exterior pocket to the open-sided shell.

In some embodiments, the wallet includes a flexible member defining a top half and a bottom half, wherein the bottom half is configured to detachably couple to the back side of the open-sided shell, and wherein the top half is configured to at least partially cover the front side of the open-sided shell, the multi-tool, and the holster, the flexible member further comprising an interior surface and an exterior surface located opposite the interior surface. The wallet may include a first exterior pocket located on the top half of the flexible member along the exterior surface, a second exterior pocket located on the bottom half of the flexible member along the exterior surface, the second exterior pocket located opposite the open-sided shell, an interior pocket located on the top half of the flexible member along the interior surface, the interior pocket located opposite the first exterior pocket, and a middle pocket located on the top half of the flexible member between the first exterior pocket and the interior pocket.

In some embodiments, the wallet also includes a pull tab coupled to the second exterior pocket and configured to extend from an opening in the second exterior pocket, the pull tab configured to facilitate removal of the at least one personal card from the second exterior pocket. The pull tab may define a first portion and a second portion, and the pull tab may be configured to move between a first position and a second position. In some embodiments, in the first position, the first portion of the pull tab is configured to extend from the opening in the second exterior pocket and the second portion of the pull tab is located at least partially within the second exterior pocket, and the at least one personal card is located within the second exterior pocket. In the second position, the first portion of the pull tab and the second portion of the pull tab may be configured to extend from the opening in the second exterior pocket, and the at least one personal card may be configured to at least partially extend from the second exterior pocket.

The multi-tool may comprise a first multi-tool, and the wallet may further comprise a second multi-tool coupled to a first end of a strap, wherein a second end of the strap is configured to couple to the bottom half of the flexible member. In some embodiments, the wallet includes a clasp pocket coupled to the top half of the flexible member along the exterior surface, wherein the clasp pocket is configured to receive at least a portion of the second multi-tool, thereby securing the flexible member in a closed position.

The interior pocket may define an identification window, and the identification window may include an aperture configured to allow a user to at least one of view and contact the at least one personal card located in the identification window. In some embodiments, the wallet includes a card coupled to an expandable loop, wherein the interior pocket is configured to receive the card and the expandable loop is configured to extend from a side portion of the flexible member, the expandable loop configured to receive and retain a pen. The back side of the open-sided shell may comprise a channel and the second exterior pocket may comprise a back plate configured to slideably couple to the channel, thereby coupling the second exterior pocket to the open-sided shell.

The foregoing, and other features and advantages of the invention, will be apparent from the following, more particular description of the preferred embodiments of the invention, the accompanying drawings, and the claims.

BRIEF DESCRIPTION OF DRAWINGS

These and other features, aspects, and advantages are described below with reference to the drawings, which are intended to illustrate, but not to limit, the invention. In the drawings, like characters denote corresponding features consistently throughout similar embodiments.

COMPONENT INDEX

100—wallet
102—first personal card receiving area
104*a*—first side wall
104*b*—second side wall
104*c*—first bottom side wall
200—second personal card receiving area
202*a*—third side wall
202*b*—fourth side wall
202*c*—second bottom side wall
300*a*—first protruding portion
300*b*—second protruding portion
400*a*—third protruding portion
400*b*—fourth protruding portion
500—at least one aperture
502—stretchable band
700—carrying device
702—carabiner
704—shackle
800*a*—first end (of carabiner)
800*b*—second end (of carabiner)
802*a*—first clip
802*b*—second clip
804*a*—first chamber
804*b*—second chamber
806—first aperture
808—second aperture
900*a*—first end (of shackle)
900*b*—second end (of shackle)
902—first screw
904—second screw
906—third aperture
908—fourth aperture
1000—wallet
1002—open-sided shell
1004—exterior pocket
1006—pull tab
1100—plate
1102—holster
1104—multi-tool
1106—personal card receiving area
1300*a*—first protruding portion
1300*b*—second protruding portion
1302—at least one aperture
1400—flexible member
1402—top half
1404—bottom half
1406—exterior surface
1408—first exterior pocket
1410—second exterior pocket
1412—clasp pocket
1500—interior pocket
1502—middle pocket
1504—interior surface
1506—second multi-tool
1508—strap
1510—identification window
1600—carrying device
1602—carabiner
1604—shackle
1606—plurality of ridges
1700*a*—first end (of carabiner)
1700*b*—second end (of carabiner)
1702*a*—first clip
1702*b*—second clip
1704*a*—first chamber
1704*b*—second chamber
1706—first aperture
1708—second aperture
1710—third aperture
1712—bottle opener
1800—carrying device
1802—carabiner
1804—shackle
1806*a*—first side wall
1806*b*—second side wall
1806*c*—third side wall
1808—divider
1900*a*—first end (of carabiner)
1900*b*—second end (of carabiner)
1902*a*—first clip
1902*b*—second clip
1904*a*—first chamber
1904*b*—second chamber
1906—first location
1908—second location
2000—first aperture
2002—opening
2004—second aperture
2006—third aperture
2008—fourth aperture
2010—fifth aperture
2012—sixth aperture
2014—seventh aperture
2100—at least one key
2102*a*—first arm
2102*b*—second arm
2200—front side
2202—back side
2204—channel
2206*a*—first hole (of first arm)
2206*b*—second hole (of second arm)
2300*a*—attaching mechanism
2300*b*—attaching mechanism
2300*c*—attaching mechanism
2300*d*—attaching mechanism
2300*e*—attaching mechanism
2302—outside environment

DETAILED DESCRIPTION OF THE INVENTION

Everyday carry devices, such as wallets, multi-tools, keyrings, phones, and the like, are, as the name implies, items meant to be carried and utilized by a user every day.

These devices help users organize their most commonly used items, including credit cards, keys, and tools, among others. This disclosure includes multiple everyday carry devices.

Figure 1:
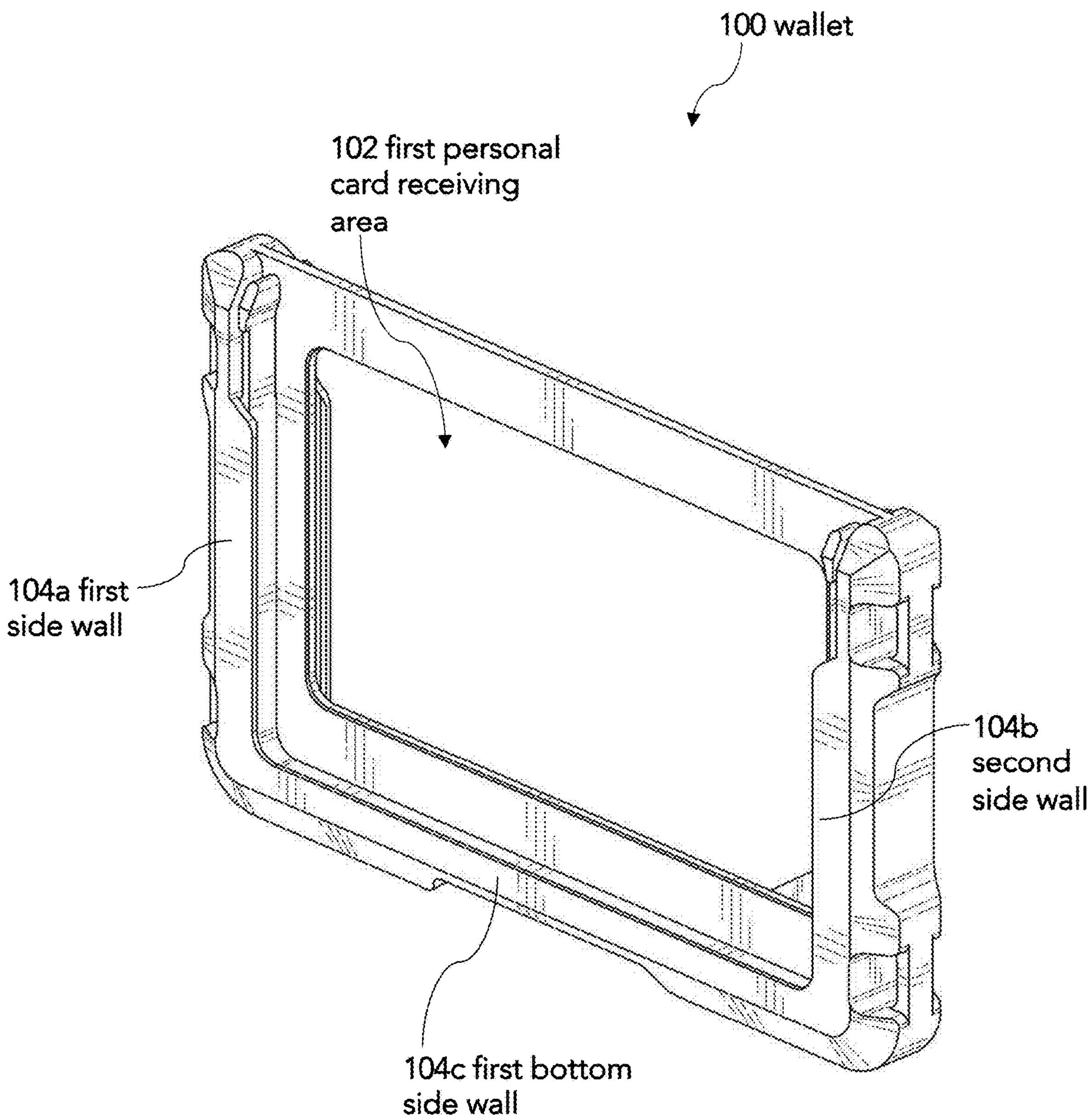
FIG. 1 illustrates a perspective view of a wallet including a first personal card receiving area, according to some embodiments.
Figure 2:
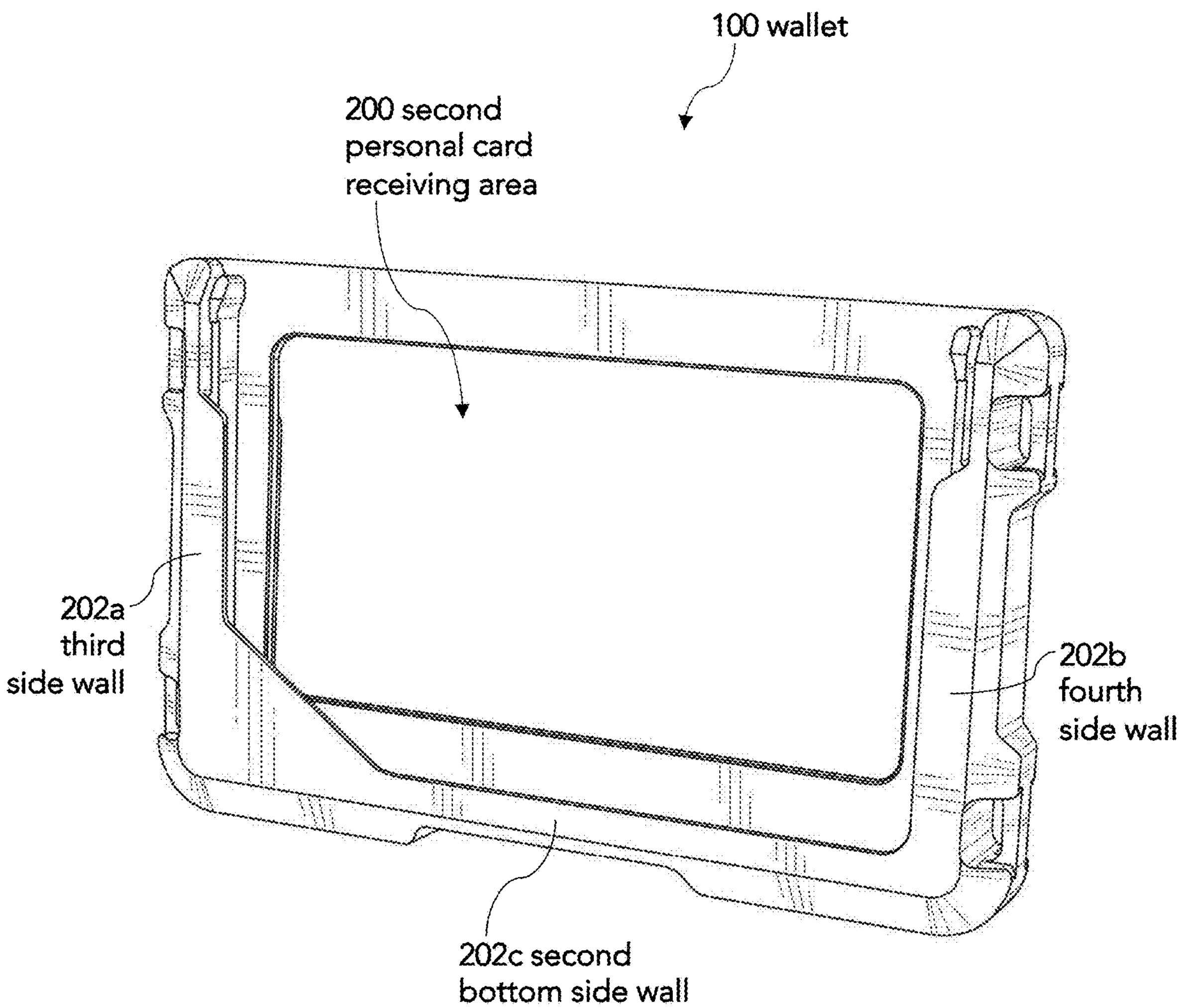
FIG. 2 illustrates a perspective view of a wallet including a second personal card receiving area, according to some embodiments.

FIG. 1 illustrates a wallet 100 including a first personal card receiving area 102. In some embodiments, as shown in FIG. 1, the first personal card receiving area 102 is bordered on three sides by a first side wall 104*a*, a second side wall 104*b*, and a first bottom side wall 104*c*. The wallet 100 may also include a second personal card receiving area 200, as shown in FIG. 2. In some embodiments, the second personal card receiving area 200 is located opposite the first personal card receiving area 102. The second personal card receiving area 200 may be bordered on three sides by a third side wall 202*a*, a fourth side wall 202*b*, and a second bottom side wall 202*c*.

In some embodiments, the first side wall 104*a* is located opposite the fourth side wall 202*b*, the second side wall 104*b* is located opposite the third side wall 202*a*, and the first bottom side wall 104*c* is located opposite the second bottom side wall 202*c*. Each of the first personal card receiving area 102 and the second personal card receiving area 200 may be configured to receive and retain at least one personal card, such as a credit card, identification card, library card, insurance card, business card, gift card, or the like. In some embodiments, each of the first personal card receiving area 102 and the second personal card receiving area 200 is configured to hold about five personal cards, depending on the thickness of each card.

Figure 3:
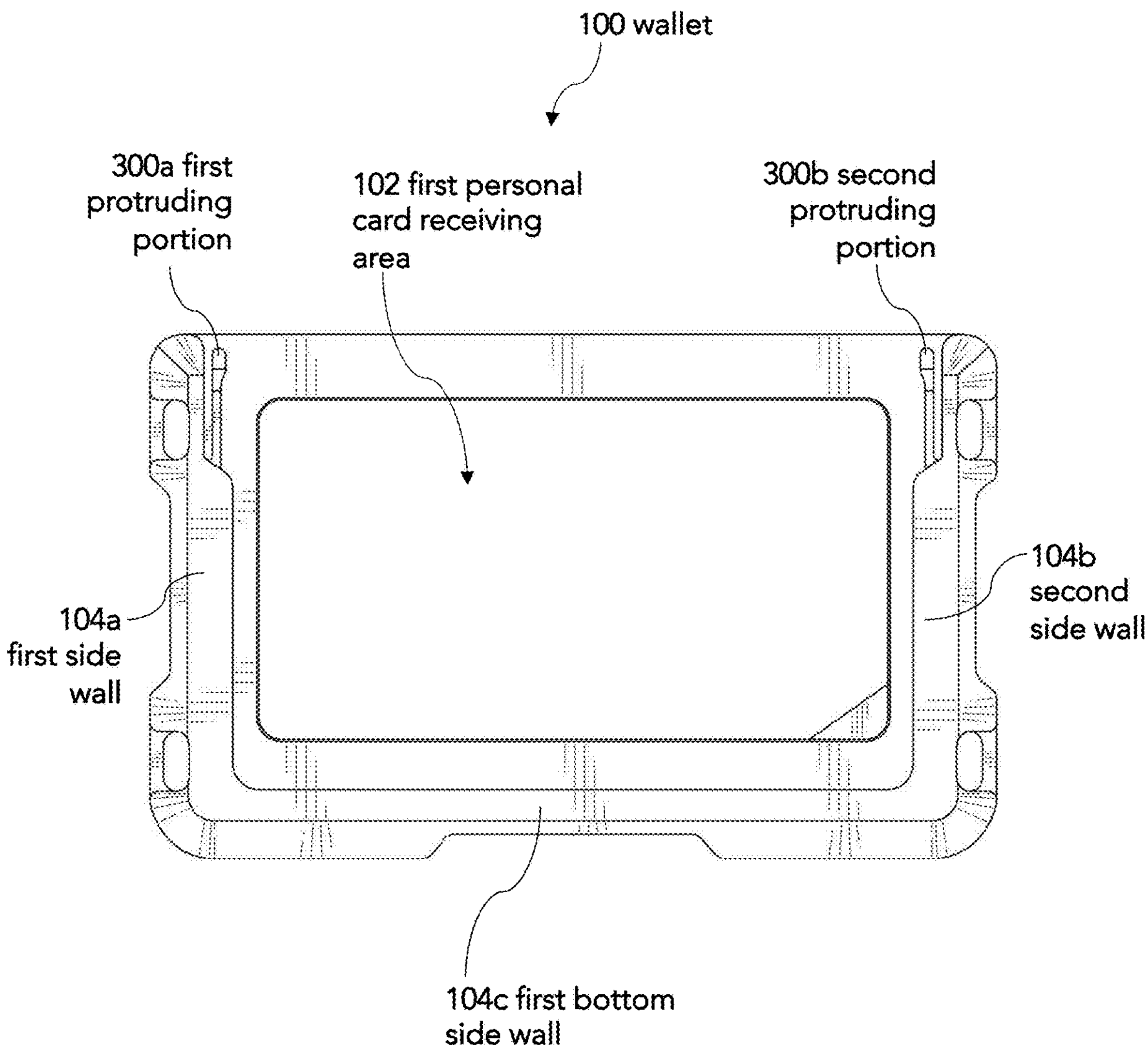
FIG. 3 illustrates a front view of a wallet, according to some embodiments.
Figure 4:
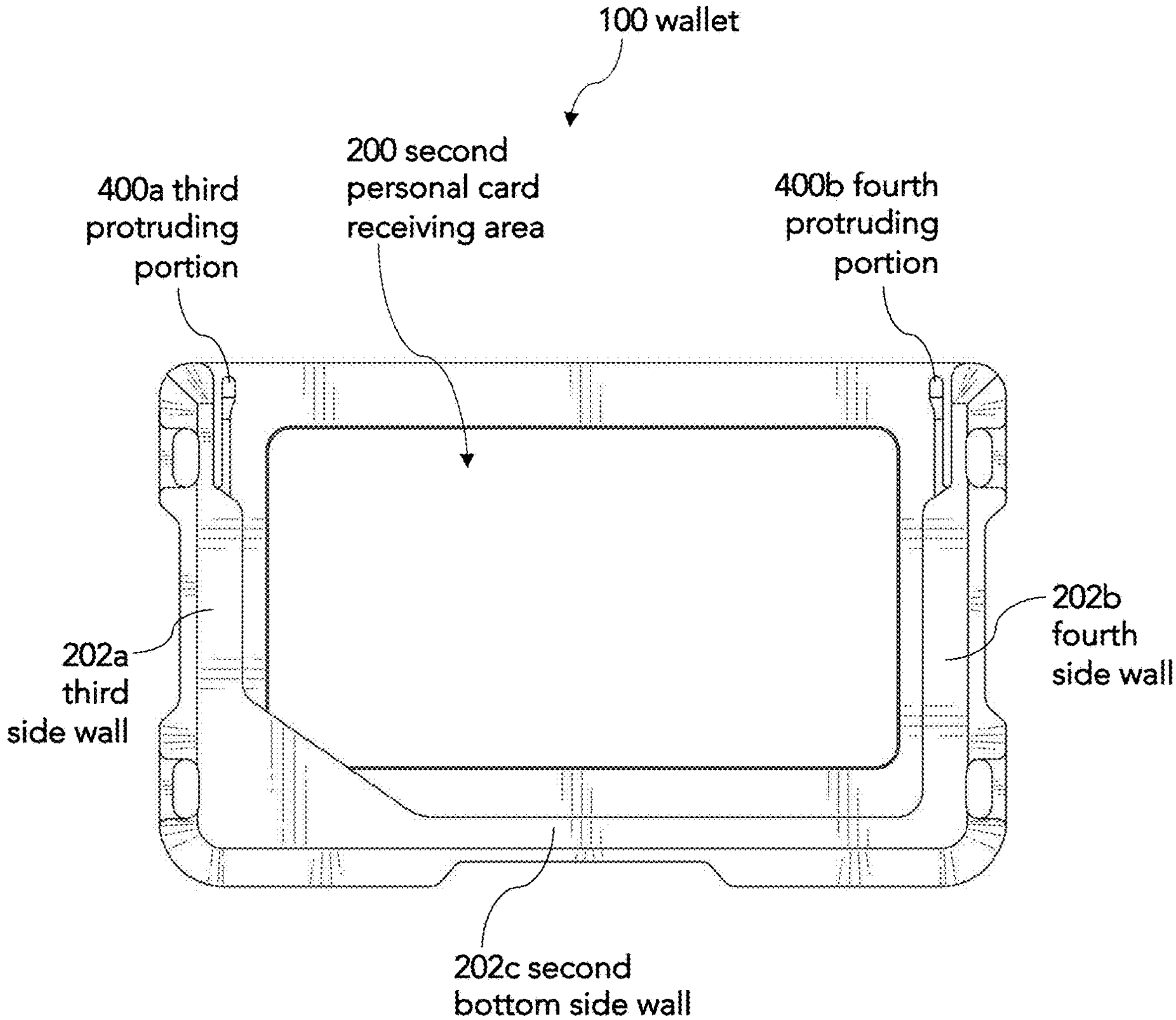
FIG. 4 illustrates a back view of a wallet, according to some embodiments.

FIG. 3 illustrates a front view of the wallet 100 and the first personal card receiving area 102. In some embodiments, the wallet 100 includes a first protruding portion 300*a* coupled to the first side wall 104*a* and a second protruding portion 300*b* coupled to the second side wall 104*b*. Similarly, as shown in FIG. 4, the wallet 100 may include a third protruding portion 400*a* coupled to the third side wall 202*a* and a fourth protruding portion 400*b* coupled to the fourth side wall 202*b*. Each of the first protruding portion 300*a*, the second protruding portion 300*b*, the third protruding portion 400*a*, and the fourth protruding portion 400*b* may be configured to move between a locked position and a receiving position. In some embodiments, in the receiving position, the first protruding portion 300*a*, the second protruding portion 300*b*, the third protruding portion 400*a*, and the fourth protruding portion 400*b* are configured to flex in order to receive the at least one personal card. In the locked position, the first protruding portion 300*a*, the second protruding portion 300*b*, the third protruding portion 400*a*, and the fourth protruding portion 400*b* may move back to their original positions in order to retain the at least one personal card within the first or second personal card receiving area 102, 200, as applicable.

Figure 5:
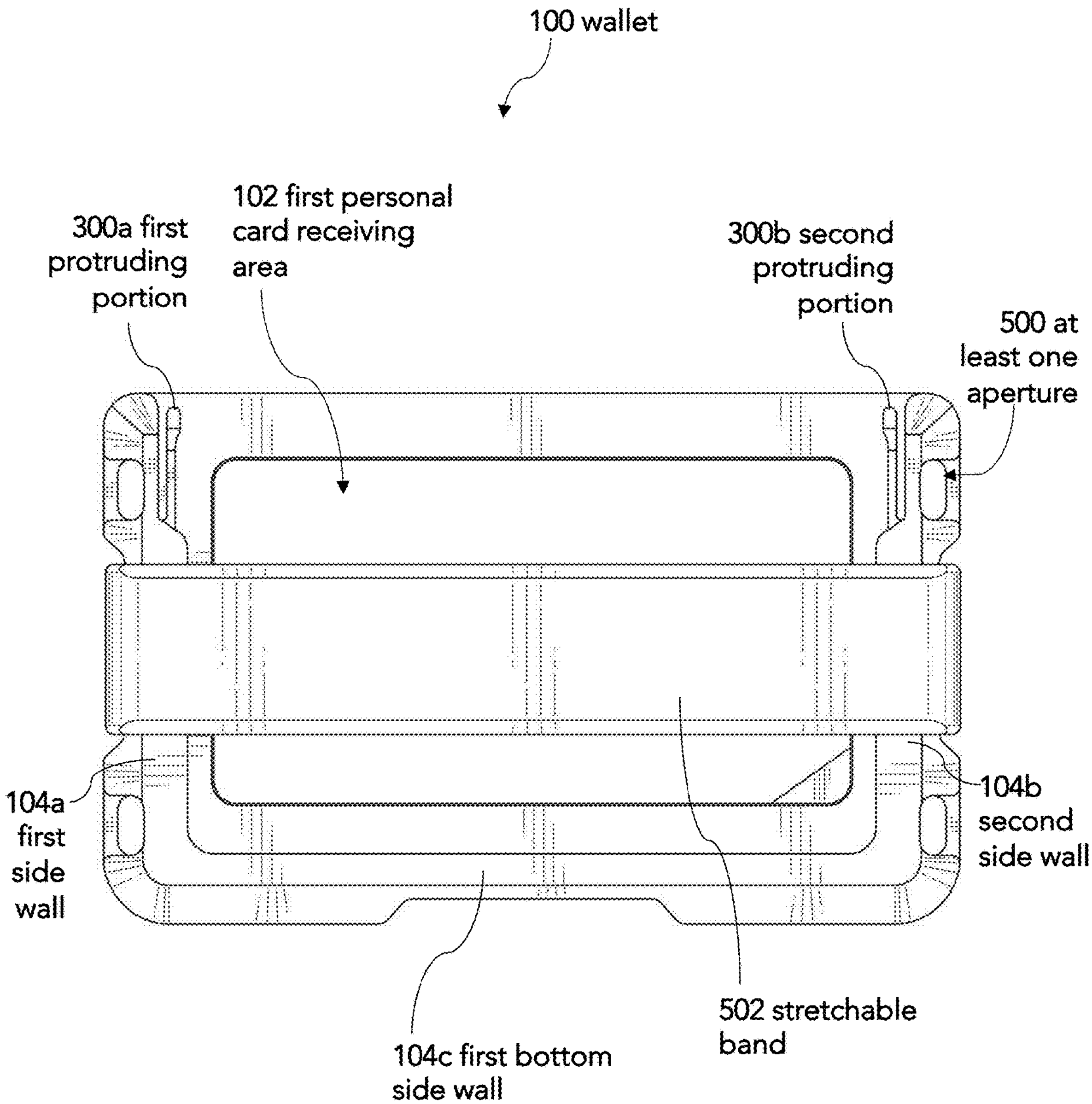
FIG. 5 illustrates a front view of a wallet including a stretchable band, according to some embodiments.
Figure 6:
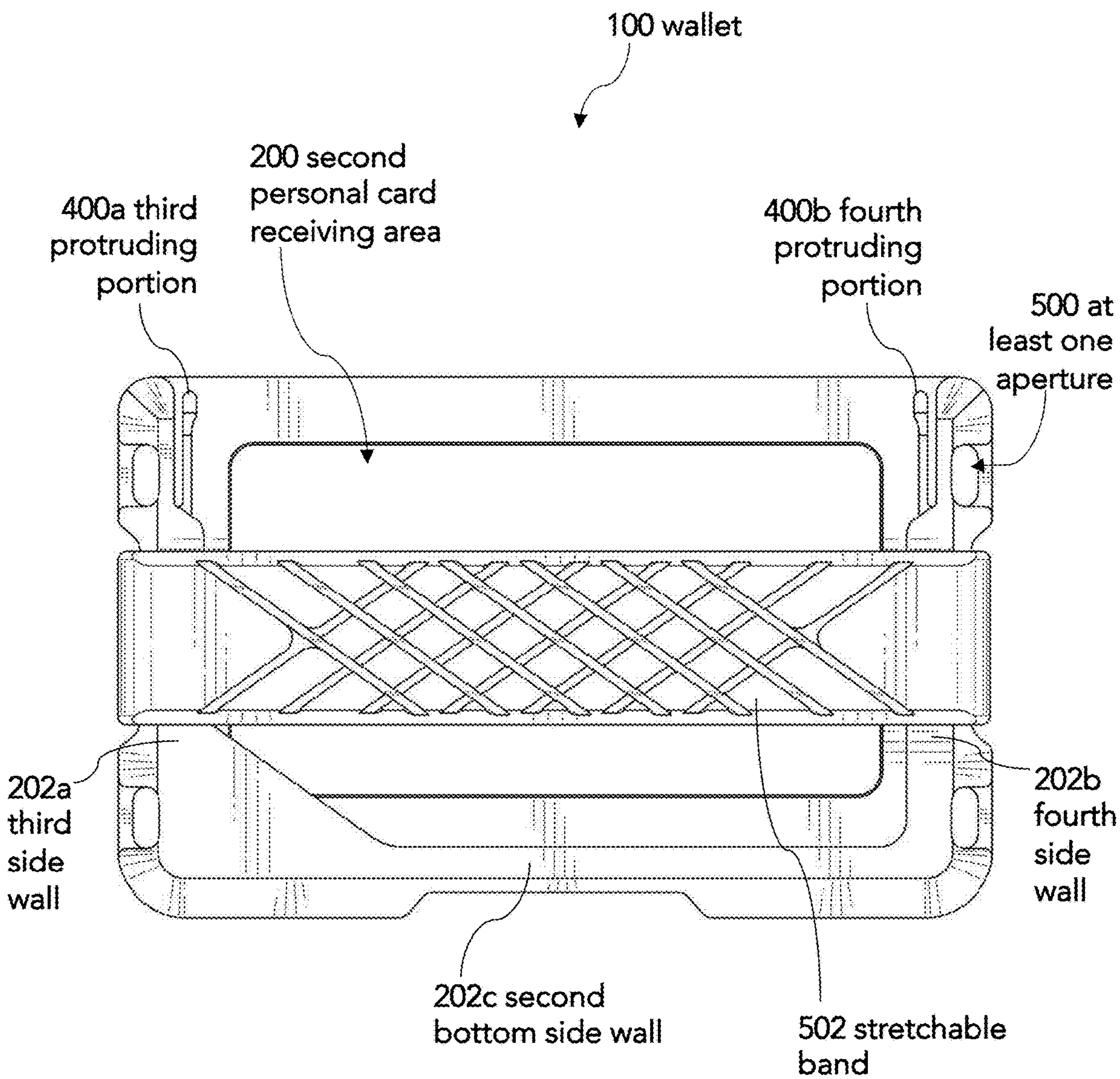
FIG. 6 illustrates a back view of a wallet including a stretchable band, according to some embodiments.

FIG. 5 illustrates that, in some embodiments, the wallet 100 includes at least one aperture 500 located around a perimeter of the wallet 100. For example, as shown in FIGS. 5 and 6, the at least one aperture 500 may include a total of four apertures. The at least one aperture 500 may include less than four apertures. In some embodiments, the at least one aperture 500 includes more than four apertures.

FIGS. 5 and 6 also include a stretchable band 502 wrapped around the wallet 100. In some embodiments, the stretchable band 502 is configured to wrap around the first side wall 104*a*, the second side wall 104*b*, the third side wall 202*a*, and the fourth side wall 202*b*. The stretchable band 502 may be configured to hold at least one personal card and/or at least one paper bill (e.g., cash) against the first personal card receiving area and the second personal card receiving area 200. The stretchable band 502 may be comprised of silicone, and the rest of the wallet 100 may be comprised of metal.

Figure 7:
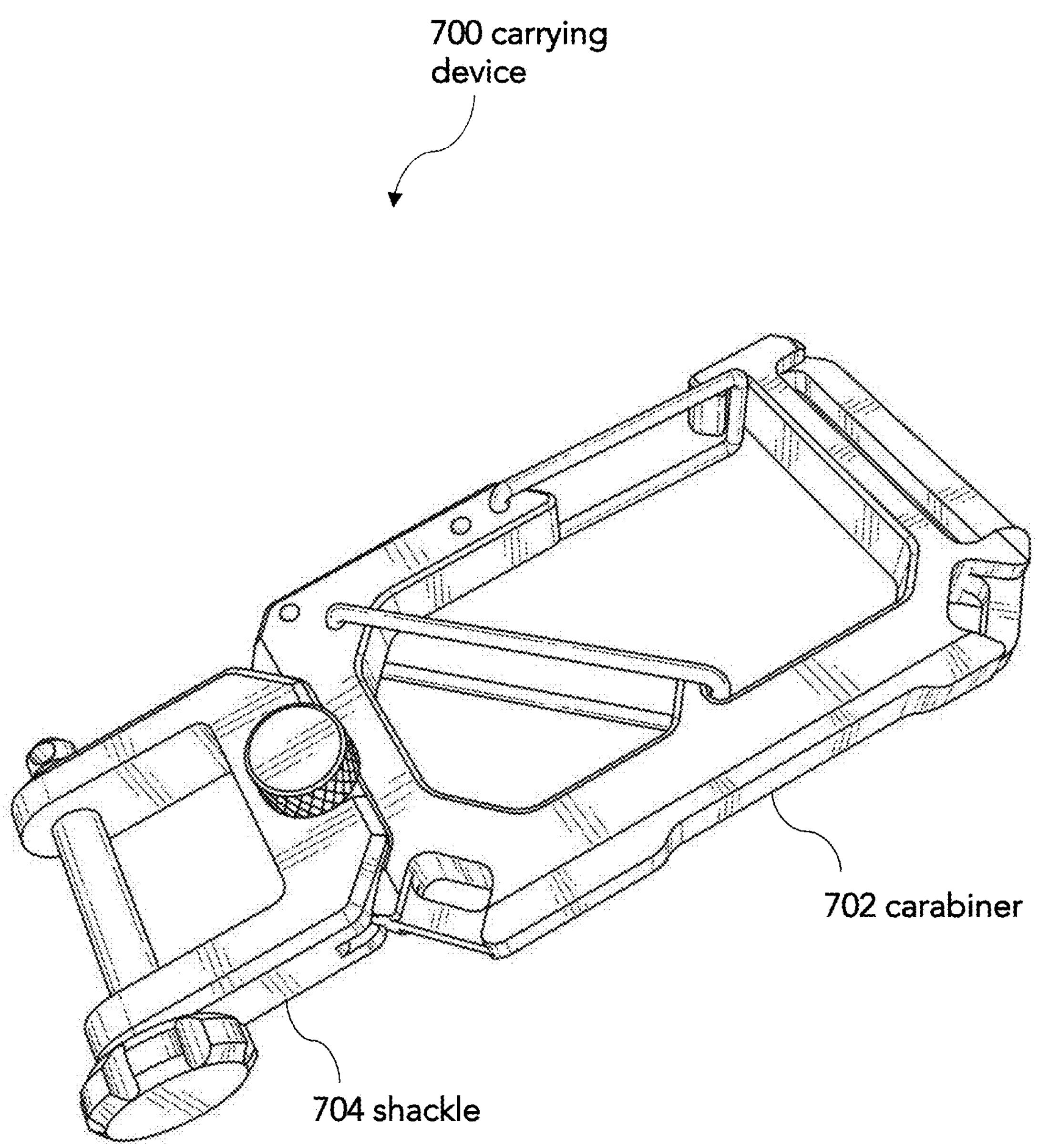
FIG. 7 illustrates a perspective view of a carrying device including a carabiner and a shackle, according to some embodiments.

FIG. 7 illustrates a carrying device 700 including a carabiner 702 and a shackle 704. In some embodiments, the shackle 704 is configured to couple to the carabiner 702, as shown in FIG. 7. It should be noted that the carabiner 702 and the shackle 704 may be used independently of one another, or they may be used when attached as one multi-piece unit, as demonstrated in FIG. 7. Each of the carabiner 702 and the shackle 704 may be comprised of metal.

Figure 8:
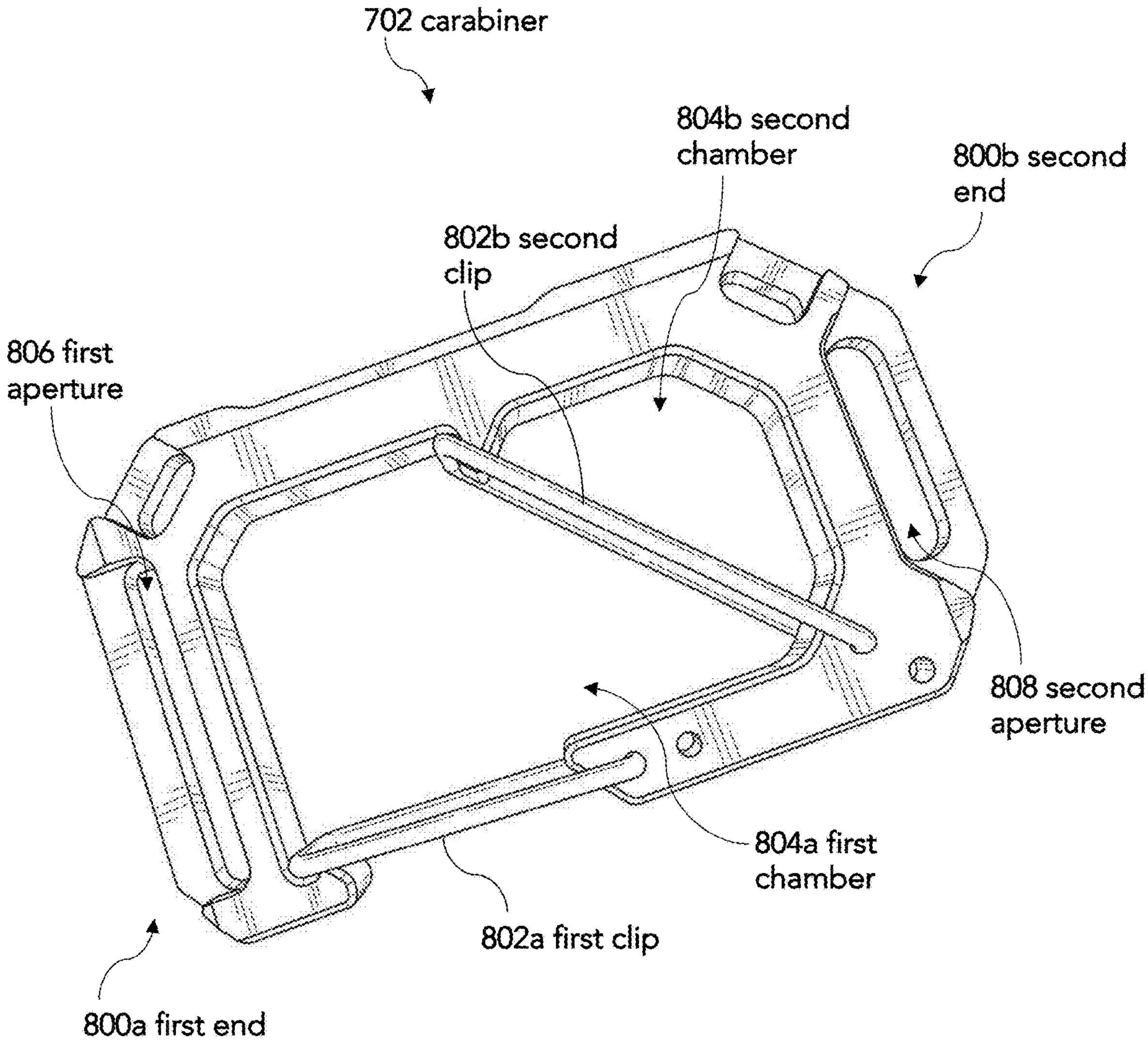
FIG. 8 illustrates a perspective view of a carabiner, according to some embodiments.

FIG. 8 shows the carabiner 702 in greater detail. In some embodiments, the carabiner 702 includes a first end 800*a* and a second end 800*b* located opposite the first end 800*a*. The carabiner 702 may also include a first clip 802*a* and a second clip 802*b*, wherein the first clip 802*a* may be configured to access a first chamber 804*a* and the second clip 802*b* may be configured to access a second chamber 804*b*. In some embodiments, the carabiner 702 includes a first aperture 806 located at the first end 800*a* and a second aperture 808 located at the second end 800*b*. The second aperture 808 may be configured to couple to the shackle 704 to thereby couple the shackle 704 to the carabiner 702.

Figure 23:
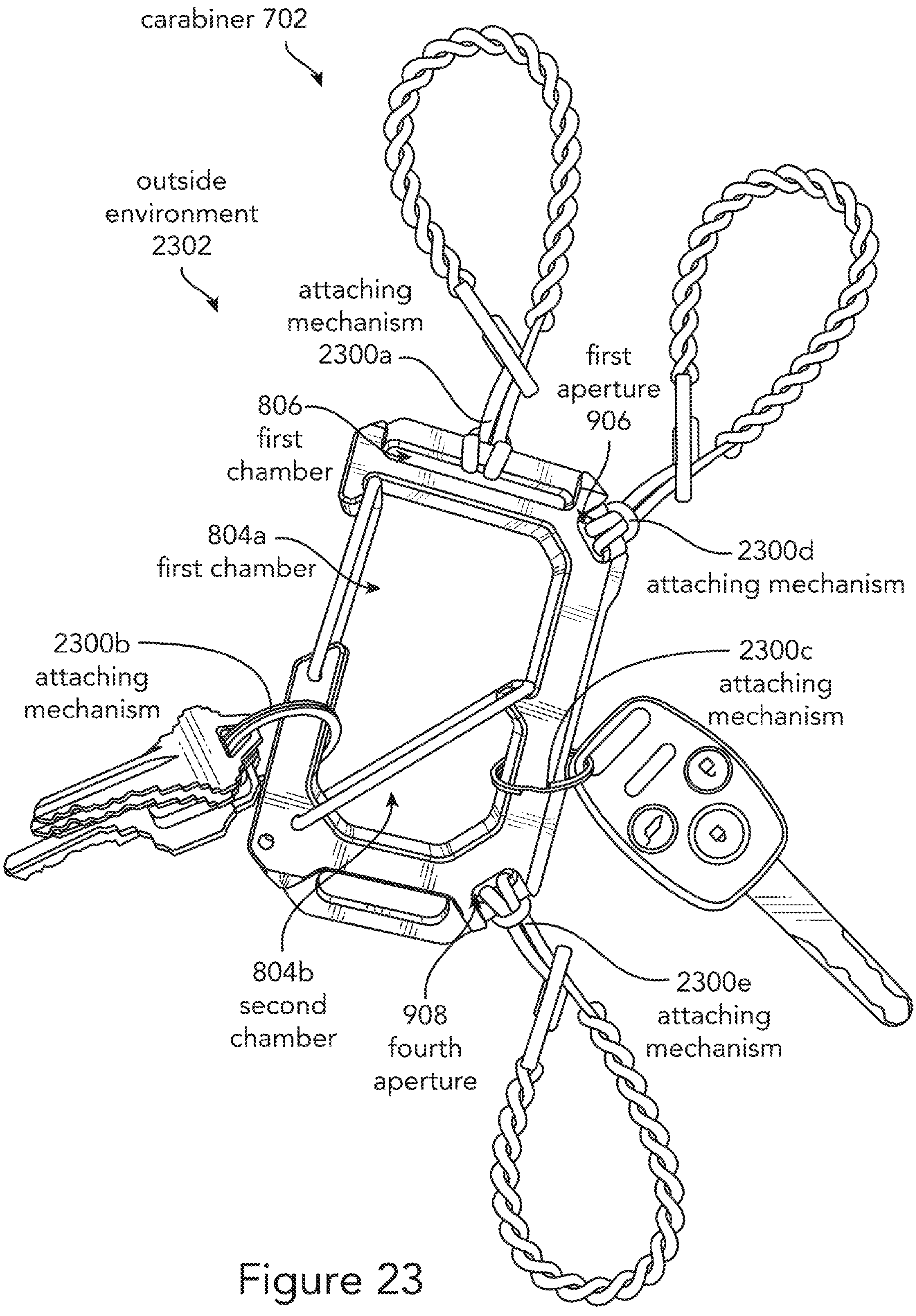
FIG. 23 illustrates a perspective view of a carabiner coupled to a plurality of attaching mechanisms, according to some embodiments.

In some embodiments, the carabiner 702 is configured to couple to at least one external element via at least one of the first chamber 804*a* and the second chamber 804*b*. For example, the first clip 802*a* may be configured to open to receive an attaching mechanism into the first chamber 804*a*. The attaching mechanism may comprise a belt loop, a strap of a bag, a tether, a lanyard, a keychain, or the like. Likewise, the second clip 802*b* may be configured to open to receive an attaching mechanism into the second chamber 804*b*. The first aperture 806 may also be configured to receive an attaching mechanism. FIG. 23 shows the carabiner 702 coupled to a plurality of attaching mechanisms.

In some embodiments, the inclusion of two separate chambers allows a user of the carrying device 700 to separate attaching mechanisms. For example, a keyring holding the user's house, apartment, or car keys may be securely coupled to the carabiner 702 via the second chamber 804*b*, while the carabiner 702 is coupled to the user's belt or bag via the first chamber 804*a*. Because the keyring is separated from the first chamber 804*a* by the second clip 802*b*, the user may be assured that the first clip 802*a* can be repeatedly opened and closed (e.g., to remove and reattach the carabiner 702 to the belt or bag) without the risk that the keyring will accidentally detach from the carabiner 702. The first chamber 804*a* and the second chamber 804*b* may be substantially the same size. In some embodiments, the first chamber 804*a* is larger than the second chamber 804*b*. The first chamber 804*a* may be smaller than the second chamber 804*b*.

Figure 9:
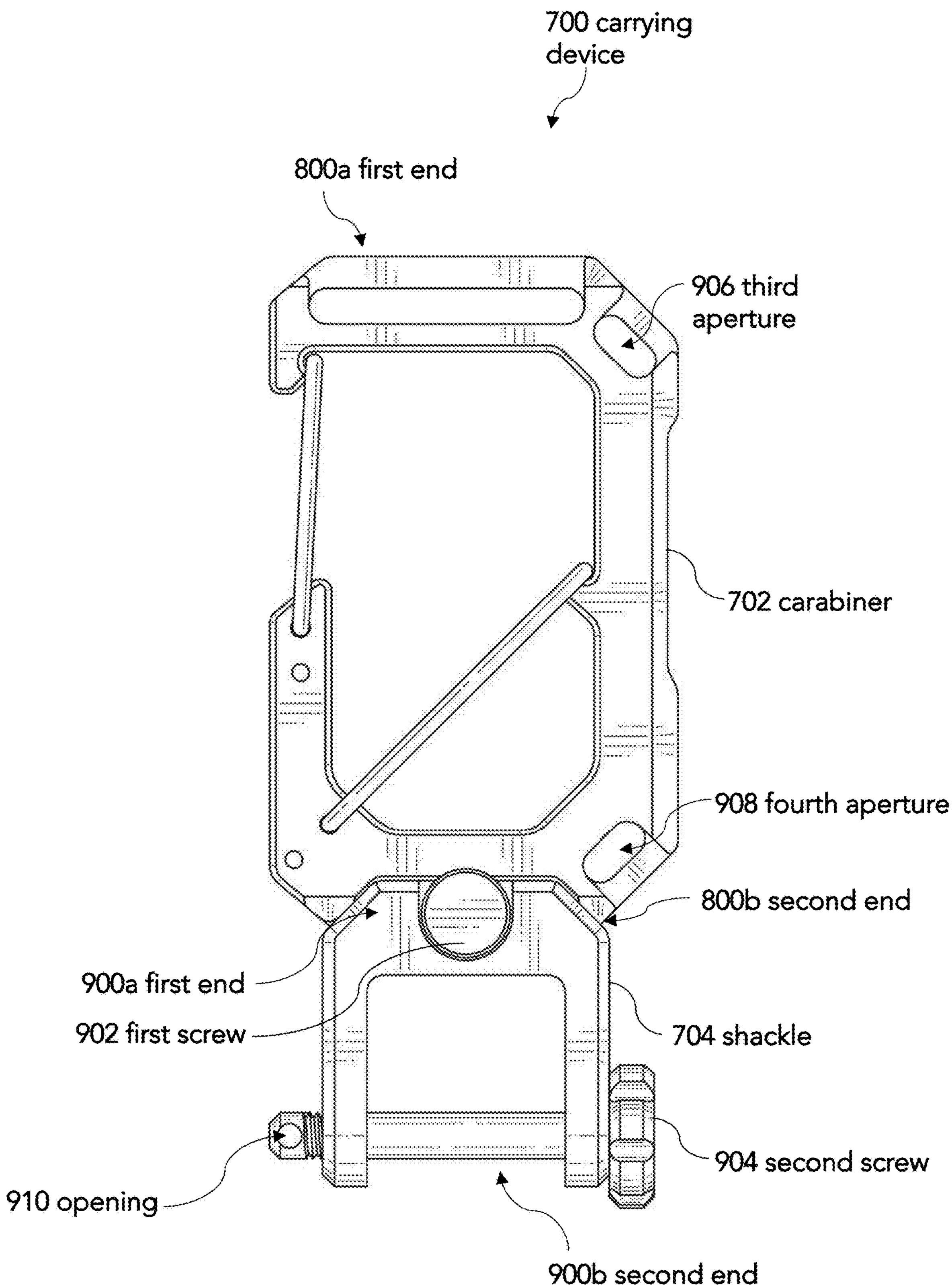
FIG. 9 illustrates a front view of a carrying device including a carabiner and a shackle, according to some embodiments.

FIG. 9 includes additional details of the carrying device 700. As previously mentioned, the shackle 704 may be configured to couple to the second end 800*b* of the carabiner 702. In some embodiments, in addition to the first aperture 806 and second aperture 808 shown in FIG. 8, the carabiner 702 includes a third aperture 906 and a fourth aperture 908. Each of the third aperture 906 and the fourth aperture 908 may be configured to couple to an attaching mechanism such as a keyring, a lanyard, a clip, a tether, or the like. FIG. 23 shows the third aperture 906 and the fourth aperture 908 each coupled to an attaching mechanism.

In some embodiments, as shown in FIG. 9, the shackle 704 comprises a first end 900*a* and a second end 900*b* located opposite the first end 900*a*. The shackle 704 may also include a first screw 902 and a second screw 904. In some embodiments, the first screw 902 is configured to couple the first end 900*a* of the shackle 704 to the second end 800*b* of the carabiner 702. The second screw 904 may be configured to detachably couple from the second end 900*b* in order to receive at least one key. For example, the second screw 904 may be configured to thread through at least one key/keyring and couple back to the second end 900*b* of the shackle 704, thereby coupling the at least one key/keyring to the shackle 704. The second screw 904 may include an opening 910 for a pin or similar mechanism to ensure secure coupling to the shackle 704. In some embodiments, the first screw 902 and the second screw 904 comprise thumb screws configured to threadably couple to the shackle 704.

Figure 10:
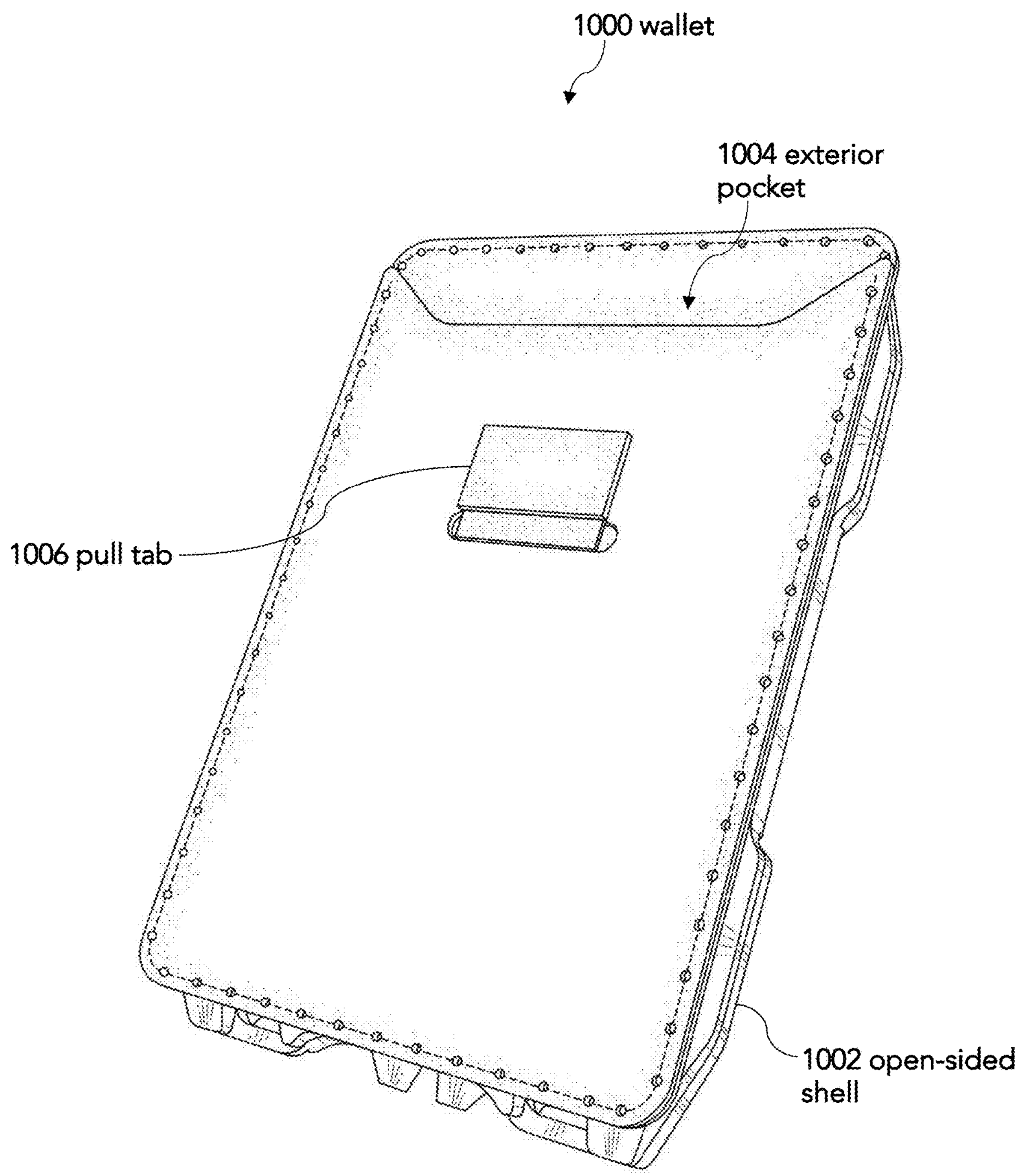
FIG. 10 illustrates a front perspective view of a wallet, according to some embodiments.

FIG. 10 illustrates a front perspective view of a wallet 1000 including an open-sided shell 1002 and an exterior pocket 1004. In some embodiments, the wallet 1000 further comprises a pull tab 1006 coupled to the exterior pocket 1004, wherein the pull tab 1006 is configured to facilitate at least partial removal of a personal card and/or paper bill located in the exterior pocket 1004.

Figure 11:
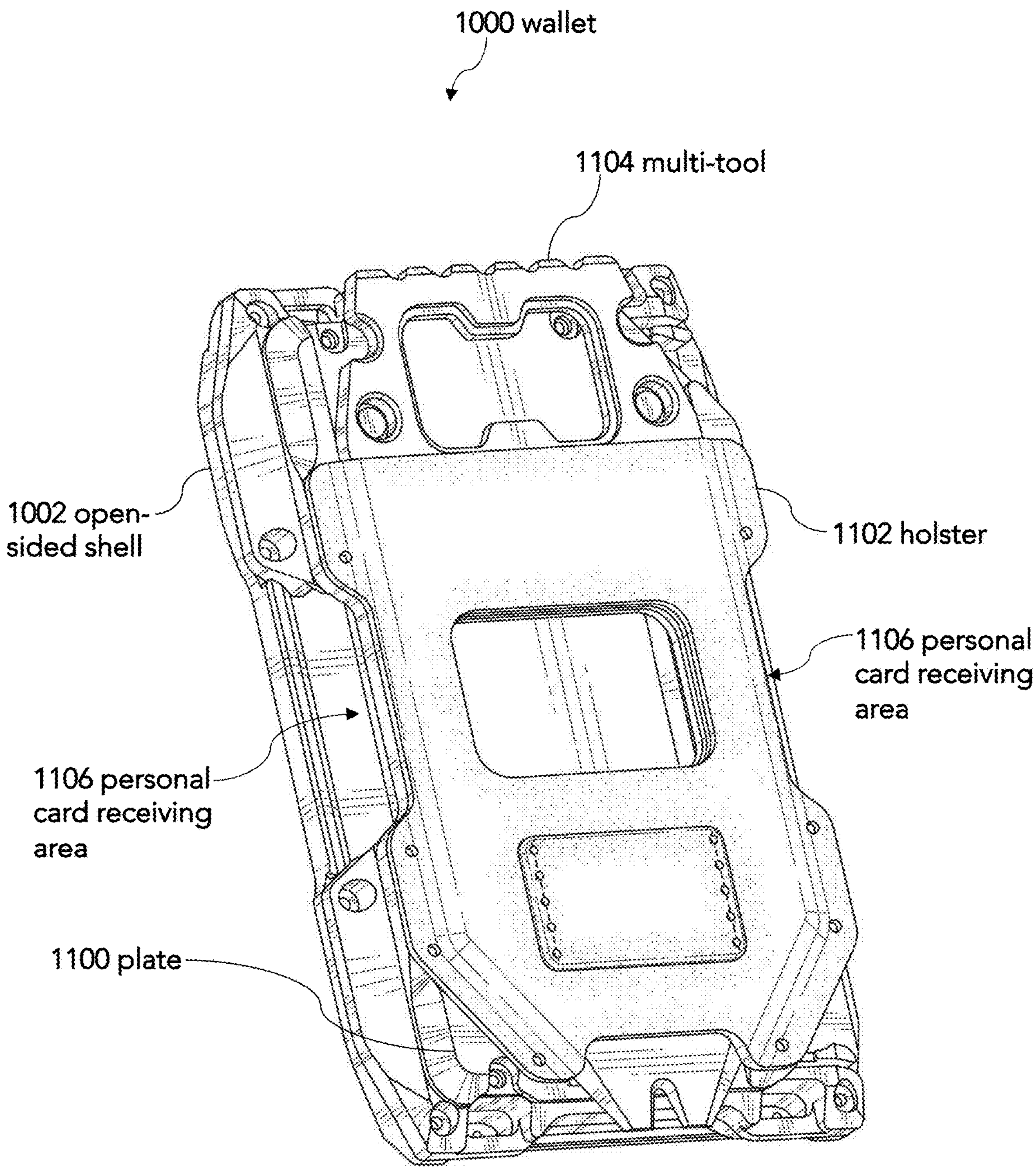
FIG. 11 illustrates a back perspective view of a wallet, according to some embodiments.

FIG. 11 illustrates a back perspective view of the wallet 1000. In some embodiments, the wallet 1000 includes a plate 1100 coupled to the open-sided shell 1002, and a holster 1102 coupled to the plate 1100. The wallet 1000 may comprise a personal card receiving area 1106 located between the open-sided shell 1002 and the plate 1100. In some embodiments, the personal card receiving area 1106 is configured to receive at least one personal card, such as a credit card, identification card, library card, insurance card, business card, gift card, or the like. The wallet 1000 may be configured to couple to a multi-tool 1104. In some embodiments, the multi-tool 1104 is configured to couple between the holster 1102 and the plate 1100. The multi-tool 1104 may define several functions, including, but not limited to, bottle opener, strap cutter, wrench, screwdriver, nail pryer, chisel, rope tensioner, sharp edge, serrated edge, hammer head, etc.

Figure 12:
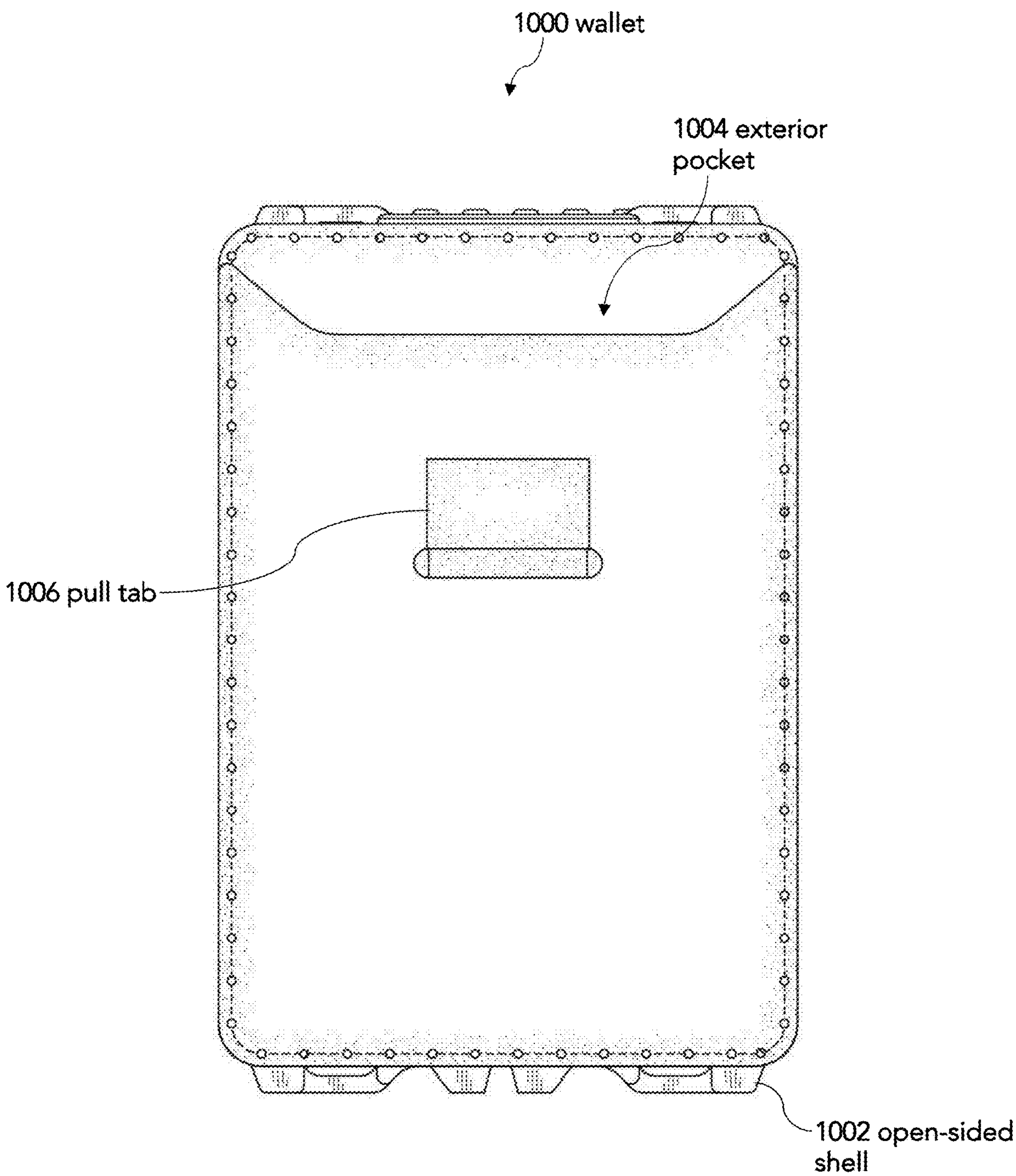
FIG. 12 illustrates a front view of a wallet, according to some embodiments.

FIG. 12 shows a front view of the wallet 1000, including a portion of the open-sided shell 1002 and the exterior pocket 1004, including the pull tab 1006. In some embodiments, the exterior pocket 1004 is removably coupled to the open-sided shell 1002. The open-sided shell 1002 may be configured to couple to a number of other accessories, such as a bifold (see FIGS. 14 and 15), a notebook, or any other type of cover. The exterior pocket 1004 may comprise a soft material, such as leather or DTEX.

Figure 13:
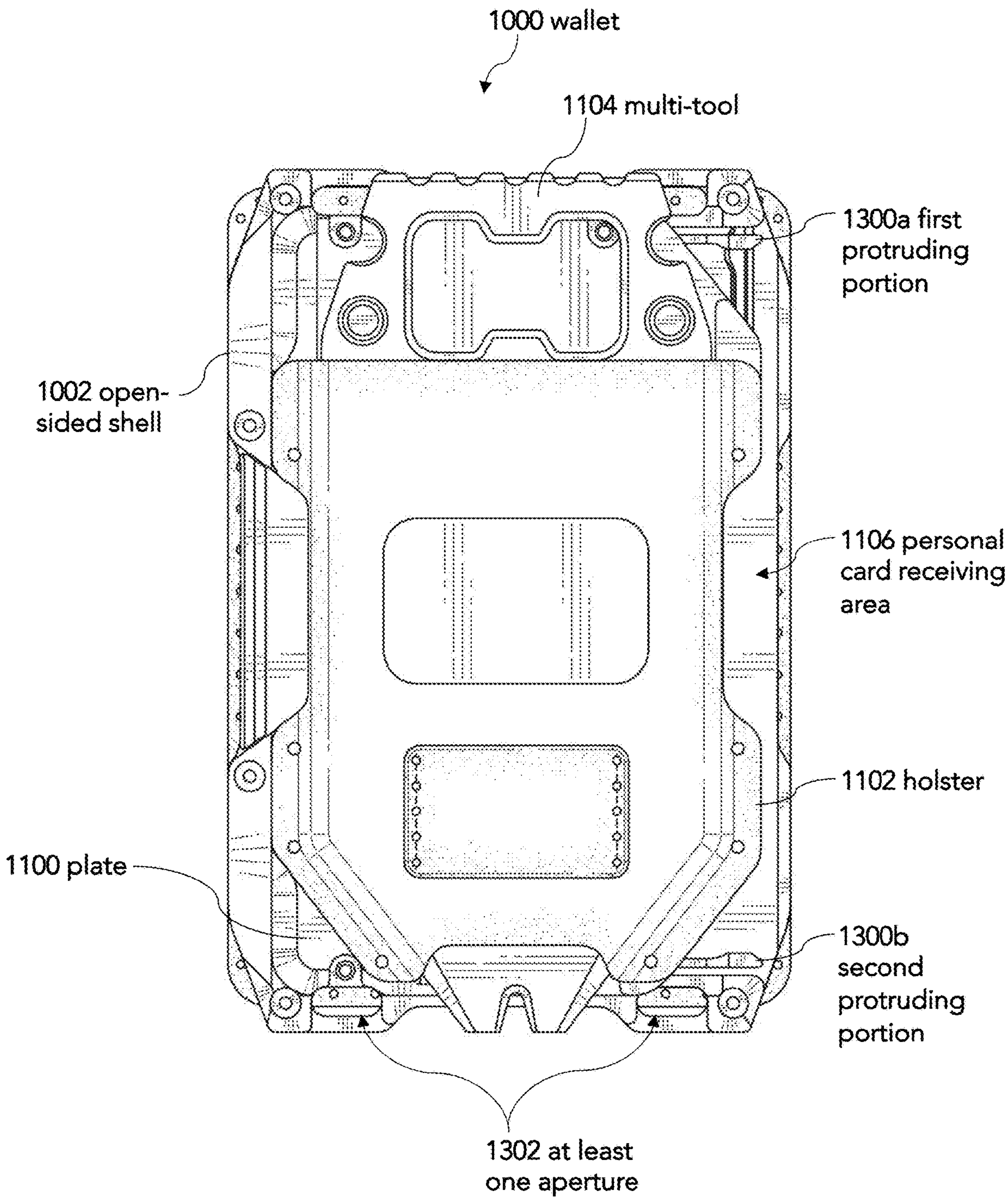
FIG. 13 illustrates a back view of a wallet, according to some embodiments.

FIG. 13 illustrates a back view of the wallet 1000. In some embodiments, as shown in FIG. 13, the wallet 1000 includes a first protruding portion 1300*a* and a second protruding portion 1300*b* coupled to the open-sided shell 1002. Each of the first protruding portion 1300*a* and the second protruding portion 1300*b* may be configured to move between a locked position and a receiving position. In some embodiments, in the receiving position, the first protruding portion 1300*a* and the second protruding portion 1300*b* are configured to flex in order to receive the at least one personal card into the personal card receiving area 1106. In the locked position, the first protruding portion 1300*a* and the second protruding portion 1300*b* may move back to their original positions in order to retain the at least one personal card within the personal card receiving area 1106.

The wallet 1000 may also include at least one aperture 1302. In some embodiments, the at least one aperture 1302 is configured to receive at least one attaching mechanism, such as a keyring, tether, lanyard, strap, clip, or the like. As shown in FIG. 13, the at least one aperture 1302 may comprise two apertures. The at least one aperture 1302 may comprise more than two apertures. In some embodiments, the at least one aperture 1302 comprises fewer than two apertures.

The plate 1100 may include at least one circular protrusion, or "nub," configured to be received by at least one opening in the multi-tool 1104. In some embodiments, coupling between the nub and the opening helps hold the multi-tool 1104 in place with respect to the holster 1102 and the plate 1100. The multi-tool 1104 may be partially removed, e.g., by disengaging the at least one nub from the at least one opening. For example, if a user wants to use the bottle opener of the multi-tool 1104 without completely removing the multi-tool 1104 from the wallet 1000, the user may disengage the at least one nub from the at least one opening and partially remove the multi-tool 1104 from the holster 1102. The holster 1102 may also be configured to at least partially surround the multi-tool 1104 such that any sharp, serrated, or otherwise abrasive components are safely held within the holster 1102 and not exposed when the wallet 1000 is in use with the multi-tool 1104 stowed.

Figure 14:
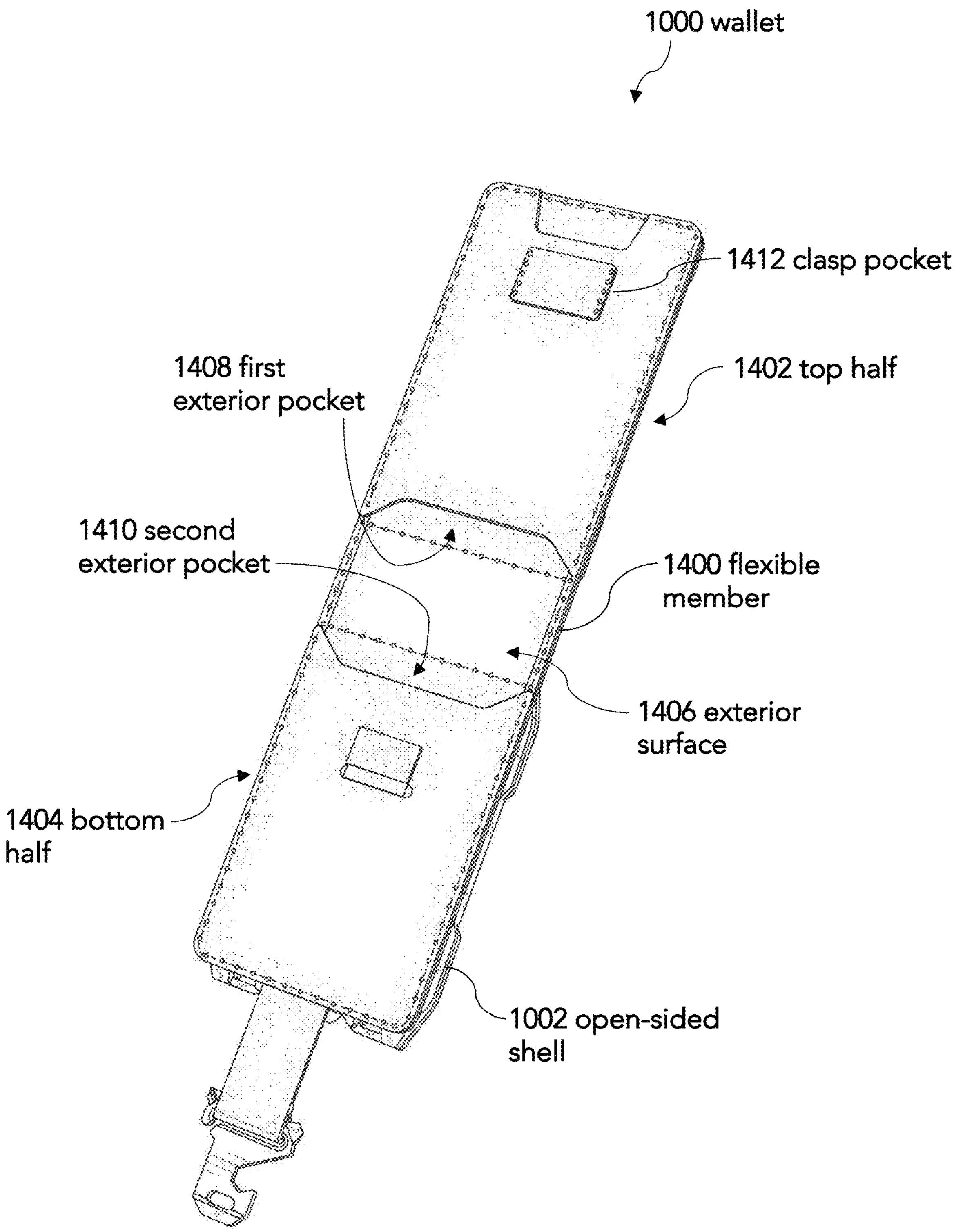
FIG. 14 illustrates an exterior perspective view of a bifold wallet in an open position, according to some embodiments.

FIG. 14 illustrates an exterior perspective view of the wallet 1000. Unlike FIGS. 10-13, where the wallet 1000 is coupled to the single exterior pocket 1004, FIG. 14 (as well as FIG. 15) illustrates the wallet 1000 coupled to a bifold-style flexible member 1400 comprising a top half 1402 and a bottom half 1404. In some embodiments, the bottom half 1404 is coupled to the open-sided shell 1002 and the top half 1402 is configured to fold around to cover the interior surface of the open-sided shell 1002, including the plate 1100, holster 1102, and multi-tool 1104. FIG. 14 shows the exterior surface 1406 of the flexible member 1400, including a first exterior pocket 1408 and a second exterior pocket 1410. In some embodiments, the first exterior pocket 1408 is coupled to the top half 1402 and the second exterior pocket 1410 is coupled to the bottom half 1404. Also shown in FIG. 14 is a clasp pocket 1412.

Figure 15:
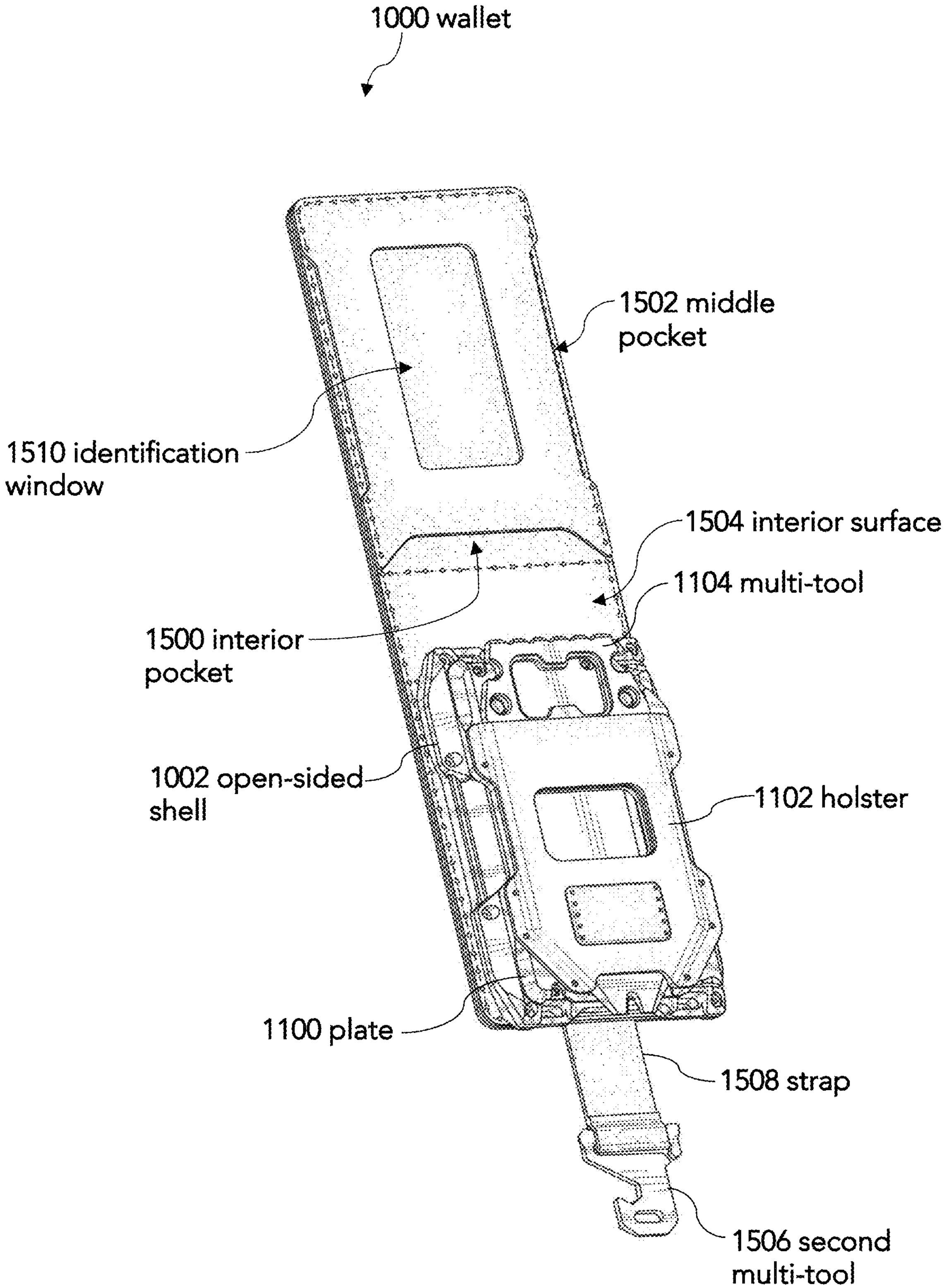
FIG. 15 illustrates an interior perspective view of a bifold wallet in an open position, according to some embodiments.

FIG. 15 shows an interior perspective view of the wallet 1000, including the interior surface 1504 of the flexible member 1400. In some embodiments, the wallet 1000 includes an interior pocket 1500 comprising an identification window 1510. The wallet 1000 may also include a middle pocket 1502 located between the interior pocket 1500 and the first exterior pocket 1408.

In some embodiments, the wallet 1000 includes a strap 1508 extending from the bottom half 1404 of the flexible member 1400. The strap 1508 may be coupled to a second multi-tool 1506. In some embodiments, the second multi-tool 1506 is configured to be received by the clasp pocket 1412 to thereby close the wallet 1000. The second multi-tool 1506 may define a number of functions, including as a screwdriver and wrench, among others.

Figure 16:
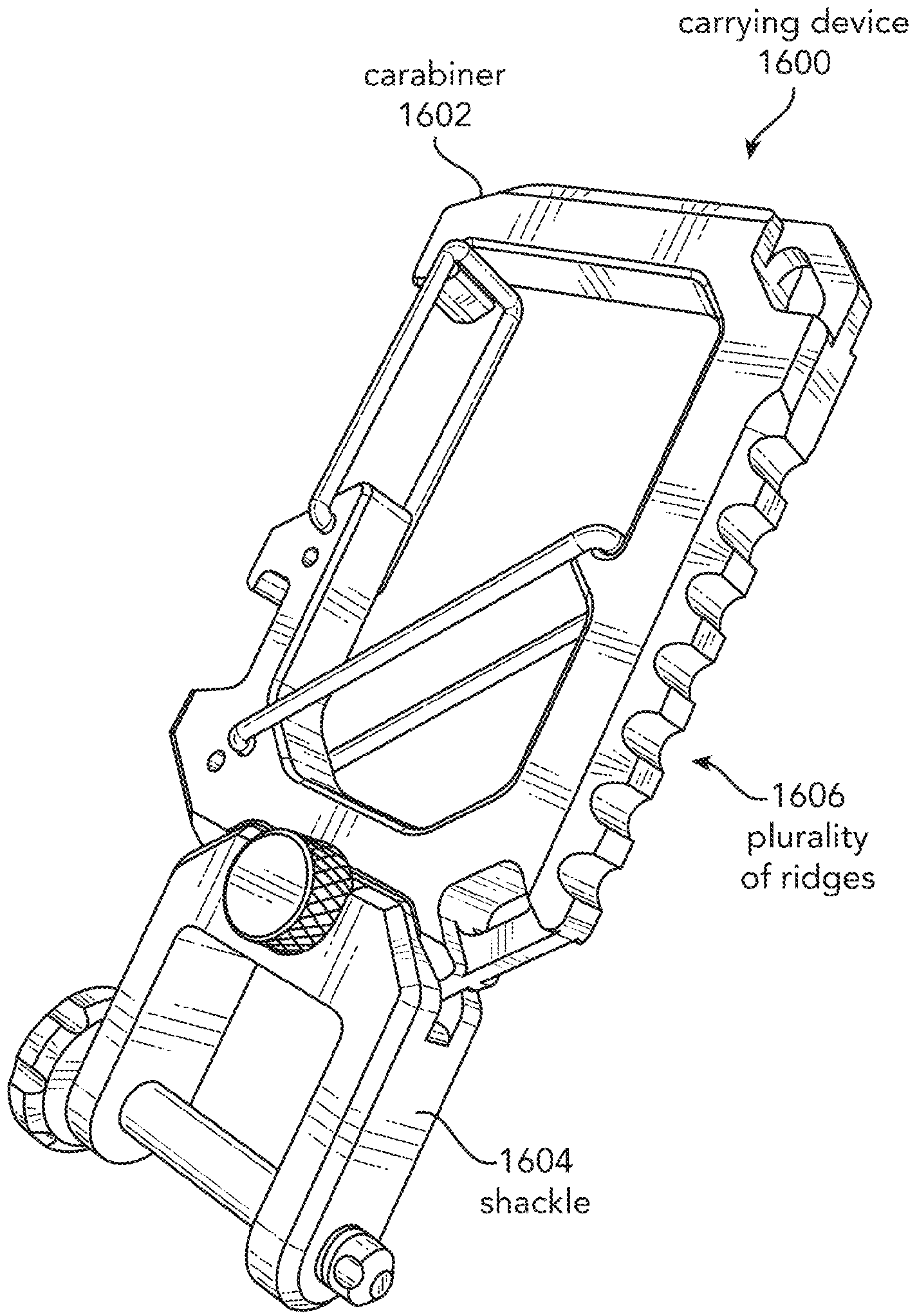
FIG. 16 illustrates a perspective view of a carrying device including a carabiner and a shackle, according to some embodiments.

FIG. 16 shows a perspective view of a carrying device 1600 including a carabiner 1602 and a shackle 1604. In some embodiments, the carrying device 1600 is similar to the carrying device 700 shown in FIGS. 7 and 9. The shackle 1604 may be configured to couple to the carabiner 1602, as shown in FIG. 16, so that the carabiner 1602 and the shackle 1604 may be used as one multi-piece unit. In some embodiments, the carabiner 1602 and the shackle 1604 are used independently of one another.

Unlike the carabiner 702 shown in FIGS. 7-9, in some embodiments, the carabiner 1602 includes a plurality of ridges 1606, as shown in FIG. 16. The plurality of ridges 1606 may be configured to enhance a user's grip on the carabiner 1602. The plurality of ridges 1606 may be thought of as a serrated edge of the carabiner 1602. In some embodiments, the carabiner 1602 includes a plurality of ridges 1606 on multiple edges, or side walls, of the carabiner 1602.

Figure 17:
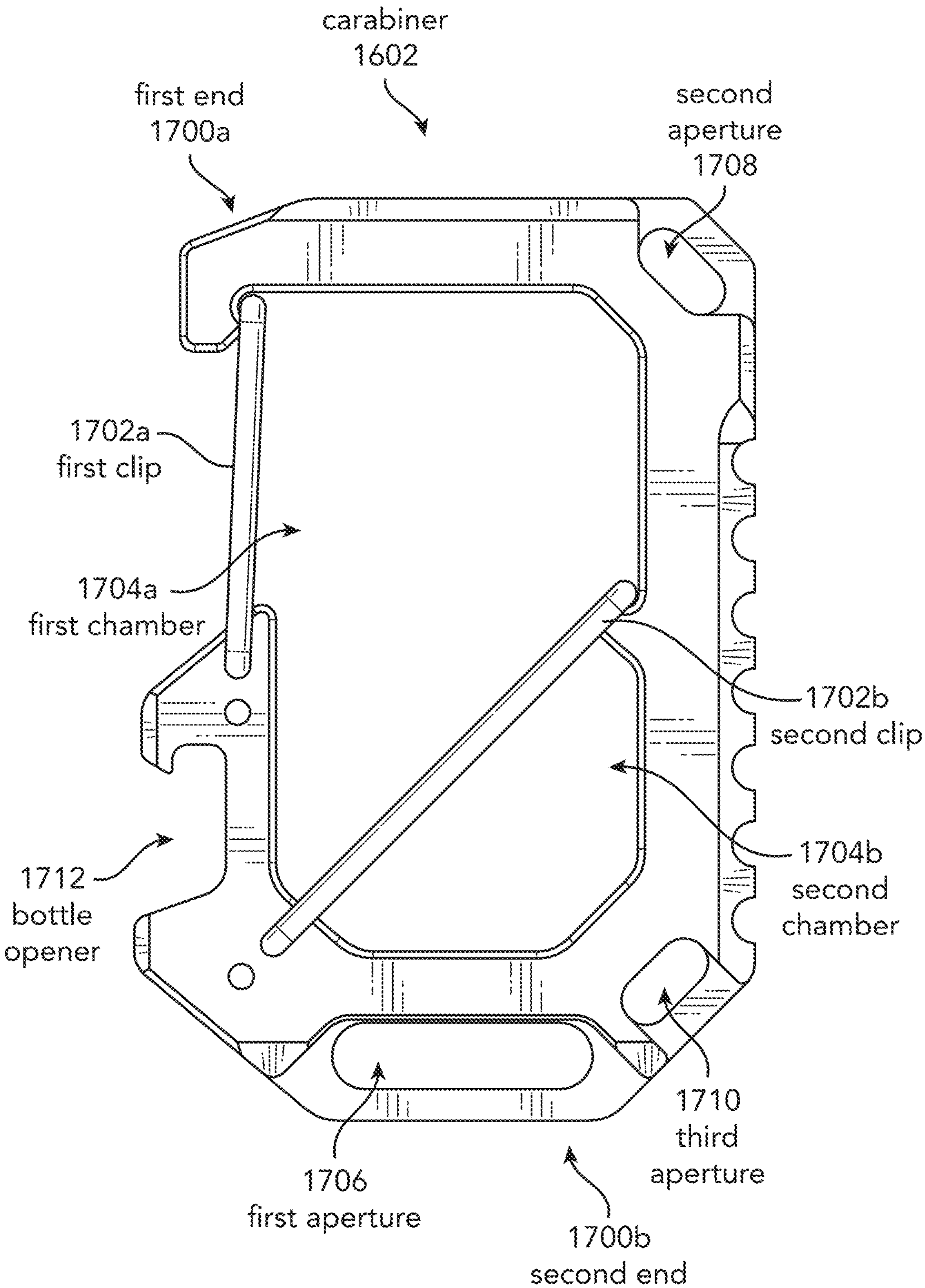
FIG. 17 illustrates a front view of a carabiner, according to some embodiments.

FIG. 17 shows a front view of the carabiner 1602 uncoupled from the shackle 1604. Similar to the carabiner 702, the carabiner 1602 may include a first end 1700*a* and a second end 1700*b* located opposite the first end 1700*a*, as well as a first clip 1702*a* and a second clip 1702*b*. In some embodiments, the first clip 1702*a* is configured to open to access the first chamber 1704*a* and the second clip 1702*b* is configured to open to access the second chamber 1704*b*. As demonstrated in FIG. 17, the first chamber 1704*a* may be located adjacent the first end 1700*a* of the carabiner 1602, and the second chamber 1704*b* may be located adjacent the second end 1700*b* of the carabiner 1602.

As discussed with reference to FIG. 8, in some embodiments, the carabiner 1602 is configured to couple to at least one external element via at least one of the first chamber 1704*a* and the second chamber 1704*b*. For example, the first clip 1702*a* may be configured to open to receive an attaching mechanism into the first chamber 1704*a*. The attaching mechanism may comprise a belt loop, a strap of a bag, a tether, a lanyard, a keychain, or the like. Likewise, the second clip 1702*b* may be configured to open to receive an attaching mechanism into the second chamber 1704*b*.

In some embodiments, the first clip 1702*a*, like the first clip 802*a* of the carabiner 702, is configured to separate the first chamber 1704*a* (or the first chamber 804*a*) from the outside environment. The second clip 1702*b*, like the second clip 802*b*, may be configured to separate the first chamber 1704*a*, 804*a* from the second chamber 1704*b*, 804*b*. Stated another way, the first clip 1702*a*, 802*a* may be considered an "initial" access point into the carabiner 1602, 702, while the second clip 1702*b*, 802*b* provides access from one portion (i.e., the first chamber 1704*a*, 804*a*) of the carabiner 1602, 702 into another portion (i.e., the second chamber 1704*b*, 804*b*) of the carabiner 1602, 702. The first chamber 1704*a* and the second chamber 1704*b* may be substantially the same size. In some embodiments, the first chamber 1704*a* is larger than the second chamber 1704*b*. The first chamber 1704*a* may be smaller than the second chamber 1704*b*.

In some embodiments, the inclusion of two separate chambers allows a user of the carrying device 1600 to separate attaching mechanisms. For example, a keyring holding the user's house, apartment, or car keys may be securely coupled to the carabiner 1602 via the second chamber 1704*b*, while the carabiner 1602 is coupled to the user's belt or bag via the first chamber 1704*a*. Because the keyring is separated from the first chamber 1704*a* by the second clip 1702*b*, the user may be assured that the first clip 1702*a* can be repeatedly opened and closed (e.g., to remove and reattach the carabiner 1602 to the belt or bag) without the risk that the keyring will accidentally detach from the carabiner 1602.

FIG. 17 also illustrates that, in some embodiments, the carabiner 1602 includes a plurality of apertures located around the perimeter of the carabiner 1602. For example, the carabiner 1602 may include a first aperture 1706 located at the second end 1700*b*, a second aperture 1708 located in a corner along the first end 1700*a*, and a third aperture 1710 located in a different corner along the second end 1700*b*. In some embodiments, the first aperture 1706 is configured to couple to the shackle 1604 to thereby couple the shackle 1604 to the second end 1700*b* of the carabiner 1602, in a manner that will be discussed in greater detail with reference to FIGS. 21 and 22. The second aperture 1708 and the third aperture 1710 may be configured to receive at least one attaching mechanism such as a tether, keyring, a lanyard, a clip, or the like. In some embodiments, the carabiner 1602 includes a bottle opener 1712 located along the perimeter of the carabiner 1602. The bottle opener 1712 may be located along a side edge opposite the plurality of ridges 1606, as shown, or may be located elsewhere along the carabiner 1602, such as along the first end 1700*a*.

Figure 18:
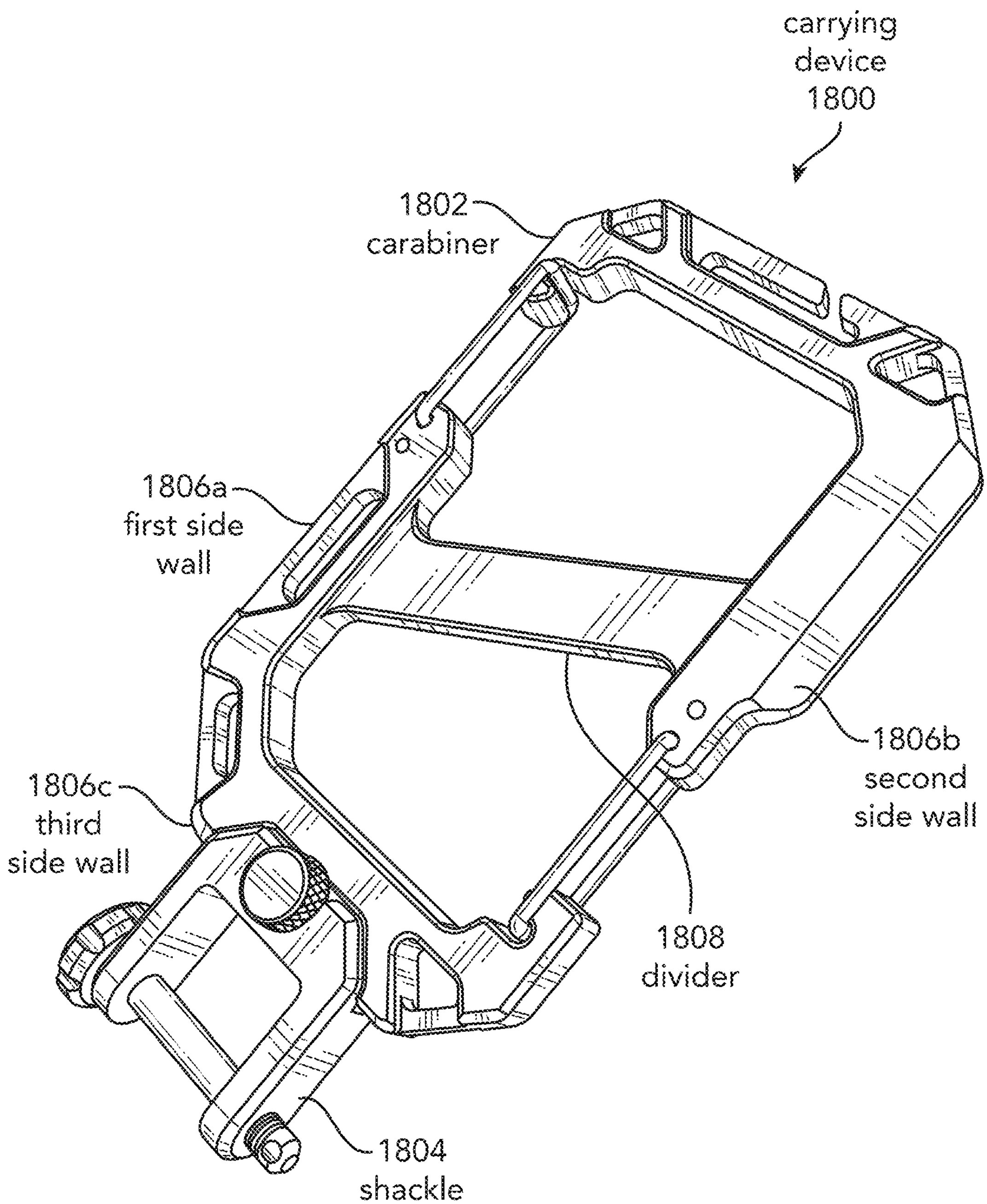
FIG. 18 illustrates a perspective view of a carrying device including a carabiner and a shackle, according to some embodiments.

FIG. 18 shows a perspective view of another carrying device 1800. Like the carrying devices 700 and 1600, the carrying device 1800 comprises a carabiner 1802 and a shackle 1804. As illustrated in FIG. 18, the carabiner 1802 may include a first side wall 1806*a*, a second side wall 1806*b*, and a third side wall 1806*c*. In some embodiments, the second side wall 1806*b* is located opposite the first side wall 1806*a*, and the third side wall 1806*c* extends between the first side wall 1806*a* and the second side wall 1806*b*. The carabiner 1802 may also include a divider 1808 fixedly coupled to the first side wall 1806*a* and the second side wall 1806*b*. In some embodiments, the divider 1808 is configured to extend at a diagonal between the first side wall 1806*a* and the second side wall 1806*b*, as demonstrated in FIG. 18. The divider 1808 may instead extend straight across such that it is substantially parallel with the third side wall 1806*c*.

Figure 19:
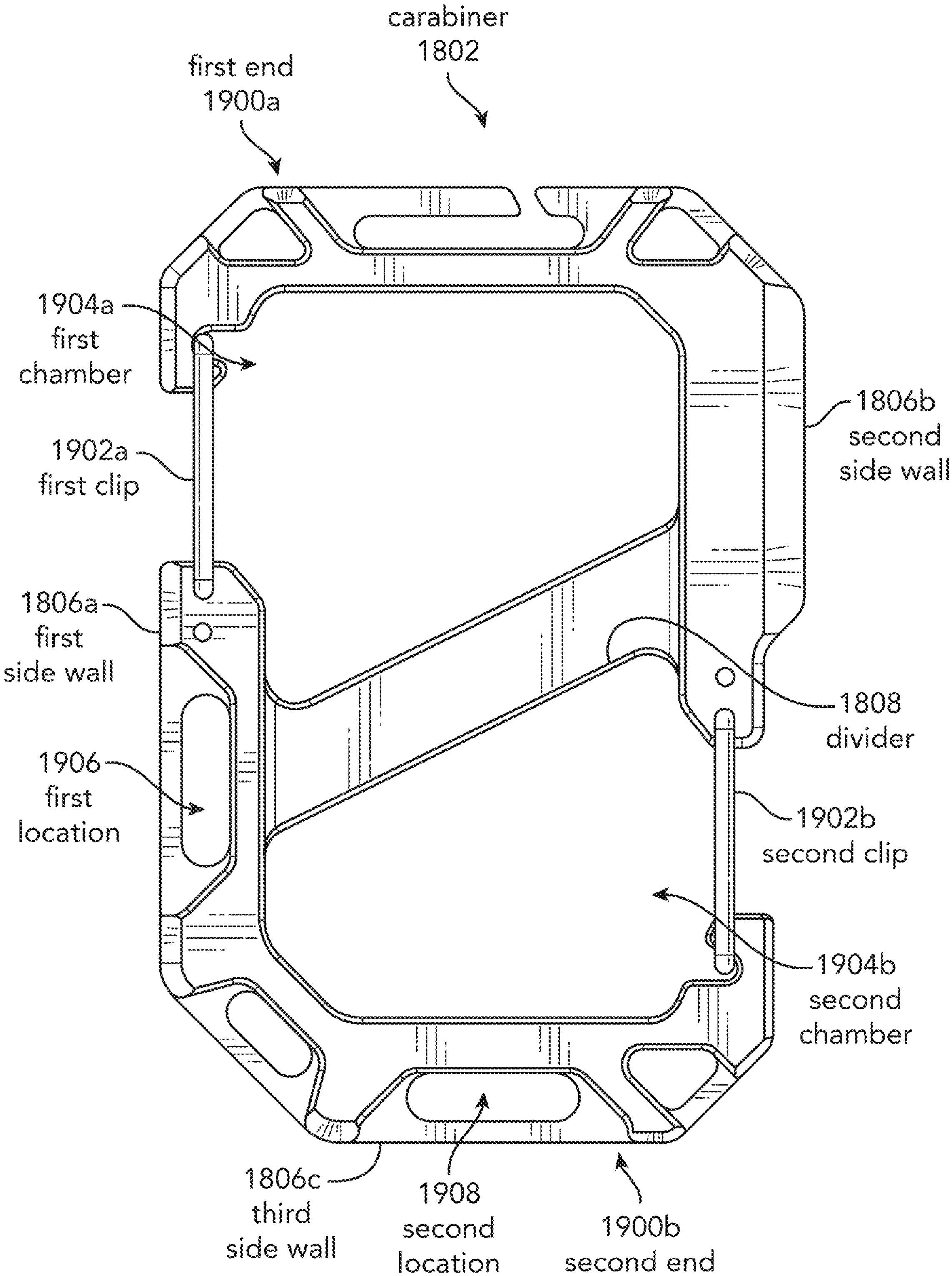
FIGS. 19 and 20 illustrate front views of a carabiner, according to some embodiments.
Figure 20:
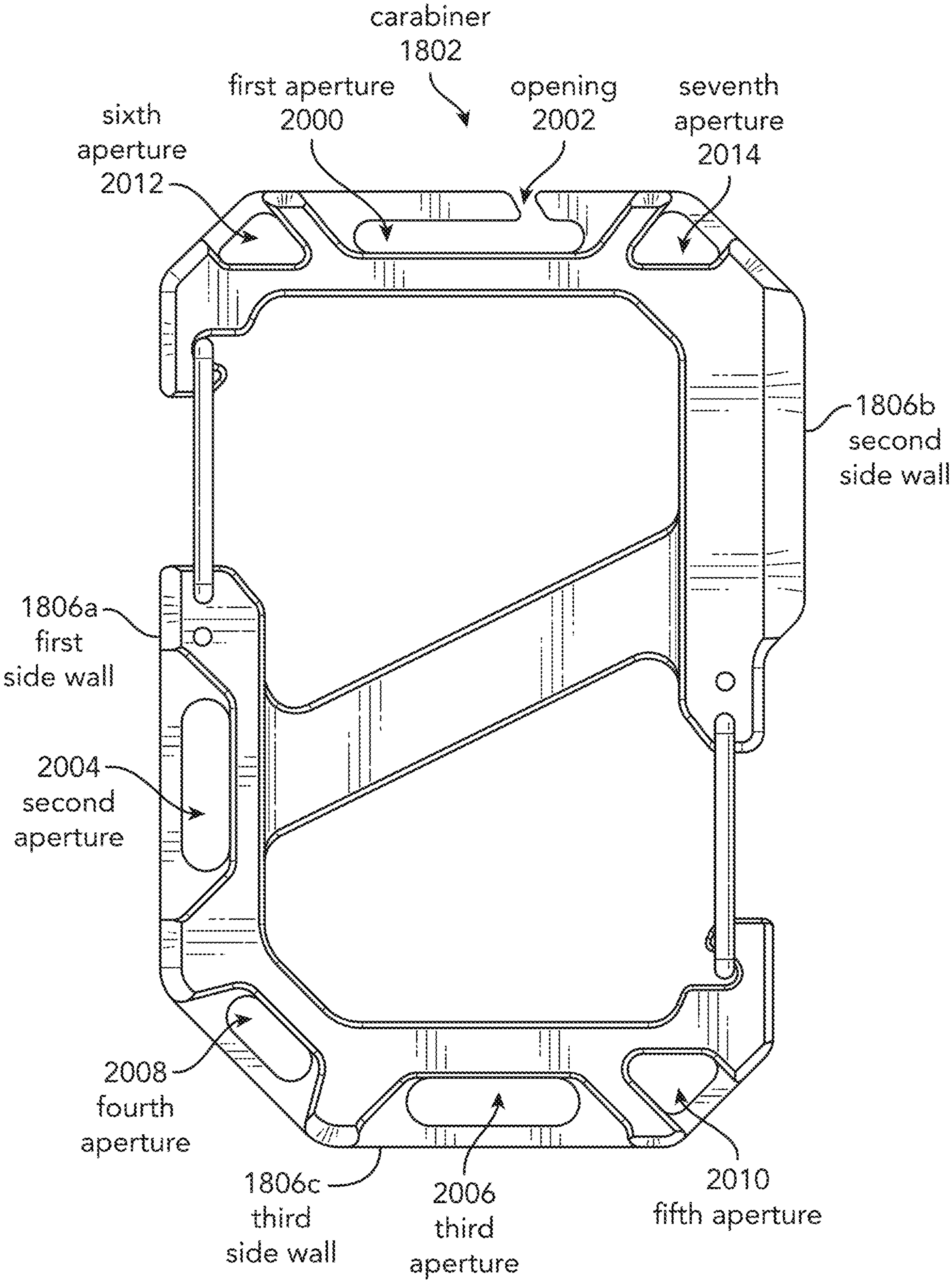

FIGS. 19 and 20 both show front views of the carabiner 1802, but highlight different features. FIG. 19 identifies the first clip 1902*a* and the second clip 1902*b*, as well as the first chamber 1904*a* and the second chamber 1904*b*. In some embodiments, the first clip 1902*a* and the first chamber 1904*a* are located adjacent the first end 1900*a* of the carabiner 1802, while the second clip 1902*b* and the second chamber 1904*b* are located adjacent the second end 1900*b*.

Similar to the other carabiners 702, 1602 included in this disclosure, the first clip 1902*a* may be configured to provide access to the first chamber 1904*a*, and the second clip 1902*b* may be configured to provide access to the second chamber 1904*b*. However, rather than needing to access the first chamber 1904*a* before reaching the second chamber 1904*b*—as with the carabiners 702, 1602—the second chamber 1904*b* may be accessed independently of the first chamber 1904*a*. In some embodiments, the first clip 1902*a* is located along the first side wall 1806*a* of the carabiner 1802, and the second clip 1902*b* is located along the second side wall 1806*b* of the carabiner 1802. The separate locations of the clips 1902*a*, 1902*b* may allow the user to independently access each chamber 1904*a*, 1904*b*. Further, in some embodiments, the divider 1808 is configured to separate the first chamber 1904*a* from the second chamber 1904*b*. The first chamber 1904*a* and the second chamber 1904*b* may be substantially the same size. In some embodiments, the first chamber 1904*a* is larger than the second chamber 1904*b*. The first chamber 1904*a* may be smaller than the second chamber 1904*b*.

As shown in FIG. 18, the shackle 1804 may be configured to couple to the carabiner 1802 along the third side wall 1806*c*. Though not shown in the Figures, the shackle 1804 may also be configured to couple to the carabiner 1802 along the first side wall 1806*a*. These two possible coupling locations are represented in FIG. 19 as the first location 1906, along the first side wall 1806*a*, and the second location 1908, along the third side wall 1806*c*. The shackle 1804, like the shackle 1604 of the carrying device 1600 and the shackle 704 of the carrying device 700, may be configured to detachably couple to the carabiner 1802 so that the carabiner 1802 and the shackle 1804 can be used independently or together as a unit.

FIG. 20 shows another front view of the carabiner 1802 and includes the first side wall 1806*a*, the second side wall

1806*b*, and the third side wall 1806*c*. Similar to the carabiner 702, 1602, the carabiner 1802 may include a plurality of apertures for attaching the shackle 1804 and/or various other attaching mechanisms such as, but not limited to, key rings, tethers, clips, lanyards, and the like. In some embodiments, the first aperture 2000 includes an opening 2002, as illustrated in FIG. 20. The opening 2002 may enable a user to couple the carabiner 1802 to a belt loop, bag strap, gear loop, or similar via the first aperture 2000. The second aperture 2004 and the third aperture 2006 may be configured to receivably couple the shackle 1804 to the carabiner 1802. As discussed with reference to FIG. 19, the shackle 1804 may be configured to couple to the carabiner 1802 at a first location 1906 (i.e., the second aperture 2004) or a second location 1908 (i.e., the third aperture 2006).

In addition to the first, second, and third apertures 2000, 2004, 2006, the carabiner 1802 may include a fourth aperture 2008 located between the second aperture 2004 and the third aperture 2006. Further, the carabiner 1802 may include a fifth aperture 2010 located adjacent the third aperture 2006 in a corner opposite the fourth aperture 2008. In some embodiments, the carabiner 1802 also includes a sixth aperture 2012 and a seventh aperture 2014. Any of the second aperture 2004, the third aperture 2006, the fourth aperture 2008, the fifth aperture 2010, the sixth aperture 2012, and the seventh aperture 2014 may be configured to couple to one or multiple attaching mechanisms such as, but not limited to, key rings, tethers, clips, lanyards, and the like. Further, the apertures may define any shape, including, but not limited to, long ovals, short ovals, triangles, rectangles, circles, and the like.

Figure 21:
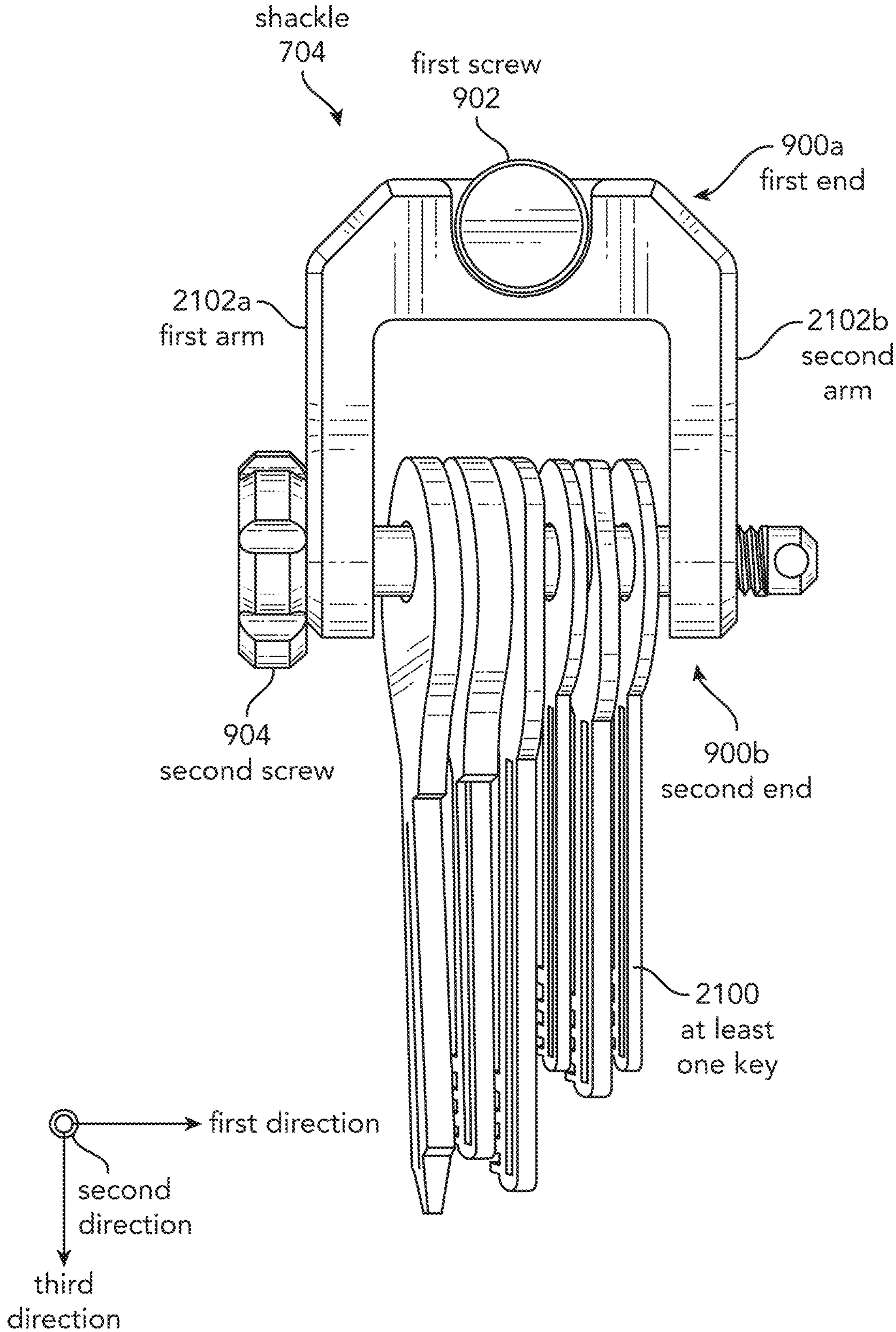
FIG. 21 illustrates a front view of a shackle coupled to at least one key, according to some embodiments.
Figure 22:
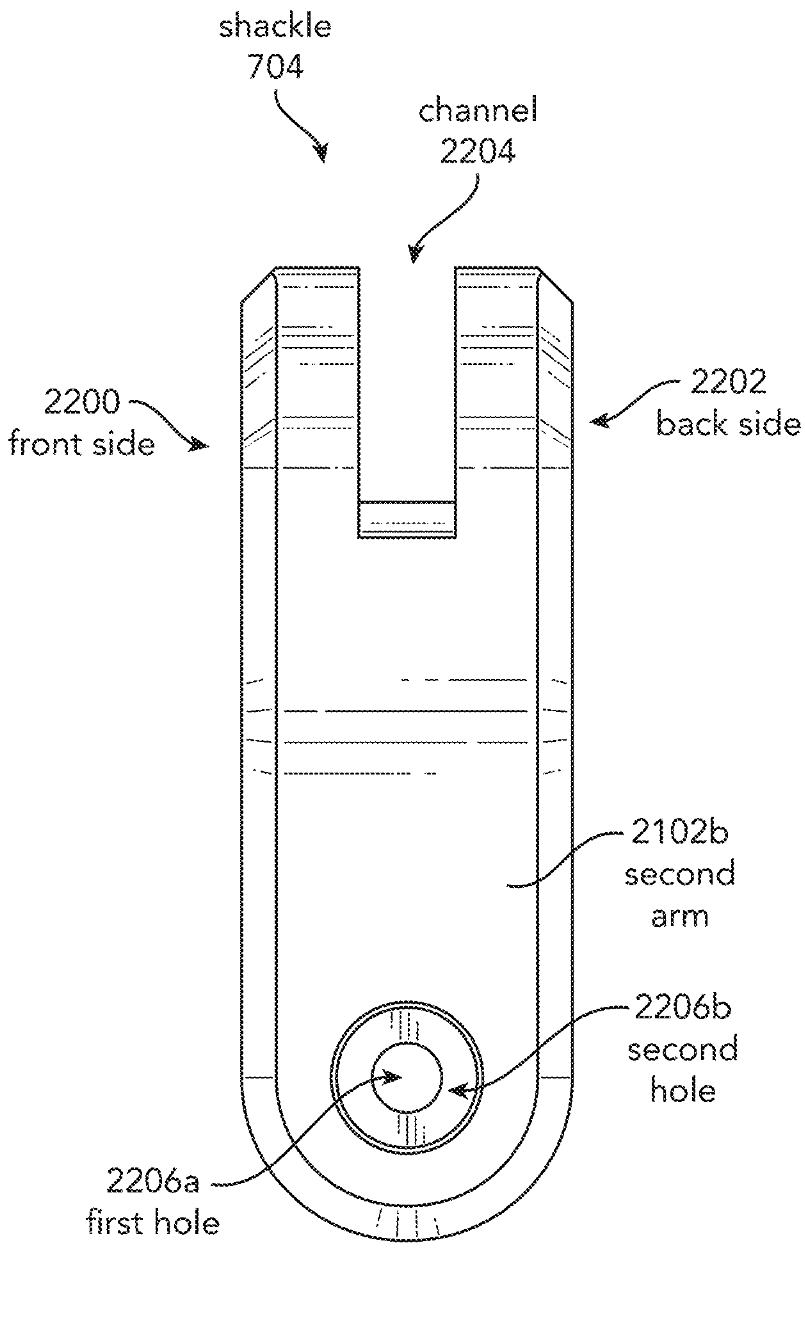
FIG. 22 illustrates a side view of a shackle, according to some embodiments.

FIGS. 21 and 22 are focused on the shackle 704. It should be noted that though the reference label "704" is specifically used in FIGS. 21 and 22, the shackle 704 may be thought of as representing the shackle 704, the shackle 1604, and the shackle 1804. In some embodiments, the shackle 704, the shackle 1604, and the shackle 1804 are all substantially the same size with substantially the same features.

As discussed with reference to FIG. 9, the shackle 704 may comprise a first end 900*a* and a second end 900*b* located opposite the first end 900*a*. In some embodiments, the shackle 704 includes a first arm 2102*a* and a second arm 2102*b*, as shown in FIG. 21. The shackle 704 may also include a first screw 902 and a second screw 904. In some embodiments, the first screw 902 is configured to couple the first end 900*a* of the shackle 704 to the second end 800*b* of the carabiner 702 (or the second end 1700*b* of the carabiner 1602, or the second end 1900*b* of the carabiner 1802). The second screw 904 may be configured to detachably couple from the second end 900*b* in order to receive at least one key 2100, as shown in FIG. 21. For example, the second screw 904 may be configured to thread through the first arm 2102*a*, through the at least one key 2100 and/or a keyring, and through the second arm 2102*b* of the shackle 704, thereby coupling the at least one key 2100 and/or keyring to the shackle 704. The second screw 904 may include an opening 910 for a pin or similar mechanism to ensure secure coupling to the shackle 704. In some embodiments, the first screw 902 and the second screw 904 comprise thumb screws configured to threadably couple to the shackle 704.

FIG. 21 also includes a directional indicator showing a first direction, a second direction, and a third direction. In some embodiments, the second screw 904 extends through the first arm 2102*a* and the second arm 2102*b* along the first direction, and the first screw 902 extends through the shackle 704 along the second direction. Each of the first arm 2102*a* and the second arm 2102*b* may extend along the third direction, as demonstrated. In some embodiments, the third direction is perpendicular to the first direction, and the second direction is perpendicular to both the first direction and the second direction.

FIG. 22 shows a side view of the shackle 704. In some embodiments, the shackle 704 defines a front side 2200, a back side 2202 located opposite the front side, and a channel 2204 extending between the front side 2200 and the back side 2202. The channel 2204 may be configured to receive a portion of the carabiner 702, 1602, 1802 to thereby couple the shackle 704 to the carabiner 702, 1602, 1802. For example, the channel 2204 may be configured to receive the second aperture 808 of the carabiner 702, the first aperture 1706 of the carabiner 1602, the second aperture 2004 of the carabiner 1802, and/or the third aperture 2006 of the carabiner 1802. When the channel 2204 receives an aperture, the first screw 902 may be configured to extend through the front side 2200 of the shackle 704, the aperture, and the back side 2202 of the shackle 704.

In some embodiments, the first arm 2102*a* of the shackle 704 includes a first hole 2206*a*, and the second arm 2102*b* of the shackle 704 includes a second hole 2206*b*. The first hole 2206*a* and the second hole 2206*b* may be configured to receive the second screw 904. In some embodiments, similar to the second screw 904, the channel 2204 extends along the first direction.

FIG. 23 shows a perspective view of the carabiner 702 coupled to several attaching mechanisms 2300. For example, in some embodiments, the first aperture 806 is configured to receive an attaching mechanism 2300*a*. The attaching mechanism 2300*a* may comprise a gear loop, the strap of a bag, a clip, a keyring, a chain, a lanyard, or a cord, as illustrated. As discussed throughout this disclosure, the first chamber 804*a* and the second chamber 804*b* may both be configured to couple to attaching mechanisms. For example, the first chamber 804*a* may couple to an attaching mechanism 2300*b* comprising a keyring with a set of building keys, as demonstrated in FIG. 23. Similarly, the second chamber 804*b* may couple to an attaching mechanism 2300*c* comprising a keyring with a car key, as shown.

The third aperture 906 and the fourth aperture 908 may be configured to couple to an attaching mechanism 2300*d* and an attaching mechanism 2300*e*, respectively. The attaching mechanisms 2300*d*, 2300*e* may comprise cords, lanyards, keyrings, clips, tethers, chains, gear loops, bag straps, and the like. It should be noted that any one or multiple of the first aperture 806, the first chamber 804*a*, the second chamber 804*b*, the third aperture 906, and the fourth aperture 908 may couple to multiple attaching mechanisms. FIG. 23 also includes the outside environment 2302, which is meant to include the environment surrounding the carabiner 702. As discussed previously, the second chamber 804*b* may be separated from the outside environment 2302 by the first chamber 804*a* such that the attaching mechanism 2300*c* may pass through the first chamber 804*a* before reaching the second chamber 804*b*, thereby reducing the chance of accidentally releasing the attaching mechanism 2300*c* into the outside environment 2302.

Further, though FIG. 23 shows the carabiner 702, the carabiner 1602 and/or the carabiner 1802 may also be configured to couple to attaching mechanisms as demonstrated in FIG. 23. Any of the apertures and chambers of the carabiner 1602 and/or the carabiner 1802 may be configured to couple to one or multiple attaching mechanisms including, but not limited to, keyring(s), clip(s), tether(s), lanyard (s), chain(s), cord(s), gear loop(s), bag strap(s), belt loop(s), and the like.

The carabiner 702, 1602, 1802, and the shackle 704, 1604, 1804 may comprise metallic materials. The metallic materials may comprise any one or a combination of aluminum, titanium, and stainless steel. A person of ordinary skill in the art will understand that many different materials may be suitable for use in constructing the carrying devices 700, 1600, 1800.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

The term "substantially" is used to mean "completely" or "nearly completely." For example, the disclosure includes, "The first chamber 804*a* and the second chamber 804*b* may be substantially the same size." In this context, "substantially the same size" is used to mean that the first chamber and the second chamber may be exactly the same size or may be close to, but not exactly, the same size.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

We claim:

1. A carrying device, comprising:

a carabiner including a first clip and a second clip, wherein the first clip is configured to open to access a first chamber and the second clip is configured to open to access a second chamber located adjacent the first chamber, wherein the carabiner comprises a first end including a first aperture and a second end located opposite the first end, wherein the second end includes a second aperture, such that the first aperture is spaced apart from the second aperture in a first direction; and a shackle defining a first end and a second end located opposite the first end, wherein the first end of the shackle is configured to detachably couple to the carabiner, and the second end of the shackle is configured to receive at least one key, wherein the first end of the shackle defines a front side, a back side located opposite the front side, and a channel extending between the front side and the back side, the channel configured to receive the second aperture of the carabiner, wherein when the channel receives the second aperture, a first screw is configured to extend through the front side of the shackle, the second aperture of the carabiner, and the back side of the shackle, such that the first screw is configured to extend through the second aperture in a second direction that is substantially perpendicular to the first direction.

2. The carrying device of claim 1, wherein the first aperture is configured to couple to an attaching mechanism and the second aperture is configured to couple to the first end of the shackle via the first screw.

3. The carrying device of claim 2, further comprising a second screw configured to couple to the second end of the shackle, wherein the second end of the shackle defines a first arm comprising a first hole and a second arm comprising a second hole.

4. The carrying device of claim 3, wherein the second screw is configured to extend through the first hole, through at least one key, and through the second hole, thereby coupling the at least one key to the second end of the shackle.

5. The carrying device of claim 4, wherein:

the first arm and the second arm each extend perpendicular to the the second direction, and the second screw extends through the first arm and the second arm along a direction perpendicular to the second direction.

6. The carrying device of claim 3, wherein the first screw comprises a first thumb screw and the second screw comprises a second thumb screw.

7. The carrying device of claim 2, wherein the carabiner further comprises a third aperture located adjacent the first aperture and a fourth aperture located adjacent the second aperture, wherein the third aperture and the fourth aperture are each configured to receive at least one attaching mechanism.

8. The carrying device of claim 2, wherein the first chamber is located adjacent the first end of the carabiner, and wherein the second chamber is located adjacent the second end of the carabiner.

9. The carrying device of claim 8, wherein each of the first chamber and the second chamber is configured to receive at least one attaching mechanism.

10. The carrying device of claim 9, wherein the at least one attaching mechanism comprises at least one of a keyring, a lanyard, a belt loop, a tether, a chain, and a strap.

11. The carrying device of claim 8, wherein the first clip is configured to separate the first chamber from an outside environment and the second clip is configured to separate the first chamber from the second chamber.

12. The carrying device of claim 8, wherein the first chamber is larger than the second chamber.

13. The carrying device of claim 1, wherein the carabiner and the shackle each comprise at least one material selected from the group consisting of aluminum, titanium, stainless steel, and combinations thereof.

14. A carrying device, comprising:

a carabiner including a first clip and a second clip, wherein the first clip is configured to open to access a first chamber and the second clip is configured to open to access a second chamber located adjacent the first chamber, wherein the carabiner comprises a first end including a first aperture and a second end located opposite the first end, wherein the second end includes a second aperture, such that the first aperture is spaced apart from the second aperture in a first direction, and wherein the first aperture is configured to couple to an attaching mechanism;

a shackle defining a first end and a second end located opposite the first end, wherein the first end is configured to detachably couple to the second aperture of the carabiner via a first screw, and the second end is configured to receive at least one key; and a second screw configured to couple to the second end of the shackle, wherein the second end of the shackle defines a first arm comprising a first hole and a second arm comprising a second hole, wherein the second screw is configured to extend through the first hole, through at least one key, and through the second hole, thereby coupling the at least one key to the second end of the shackle, wherein the first screw extends through the second aperture along a second direction perpendicular to the first direction, wherein the first arm and the second arm each extend perpendicular to the second direction, and wherein the second screw extends through the first arm and the second arm along a direction perpendicular to the second direction.

15. The carrying device of claim 14, wherein the first end of the shackle defines a front side, a back side located opposite the front side, and a channel extending between the front side and the back side, the channel configured to receive the second aperture of the carabiner to thereby couple the shackle to the carabiner.

16. The carrying device of claim 14, wherein the second screw comprises an opening configured to enable a secure coupling between the second screw and the shackle.

17. The carrying device of claim 16, wherein when the second screw is coupled to the second end of the shackle, the opening is located adjacent to one of the first hole of the first arm and the second hole of the second arm such that when the second screw is securely coupled to the shackle, the second screw is unable to exit the first hole and the second hole.

18. The carrying device of claim 14, wherein the first screw and the second screw each comprise thumb screws configured to threadably couple to the shackle.

19. The carrying device of claim 14, wherein the first chamber defines a first size and the second chamber defines a second size that is different from the first size.

* * * * *